United States Patent
Sabounjian

(10) Patent No.: US 6,427,858 B2
(45) Date of Patent: Aug. 6, 2002

(54) LAUNDRY DRYING RACK

(75) Inventor: Azad Sabounjian, Aneheim Hills, CA (US)

(73) Assignee: Pro-Mart Industries, Inc., Rancho Cucamonga, CA (US)

(*) Notice: Subject to any disclaimer, the term of this patent is extended or adjusted under 35 U.S.C. 154(b) by 0 days.

(21) Appl. No.: 09/746,115

(22) Filed: Dec. 21, 2000

Related U.S. Application Data

(63) Continuation-in-part of application No. 09/483,585, filed on Jan. 14, 2000, now abandoned, which is a continuation-in-part of application No. 09/233,275, filed on Jan. 19, 1999.

(51) Int. Cl.⁷ ............................................. A47B 43/00
(52) U.S. Cl. ........................ 211/202; 211/183; 211/200
(58) Field of Search .................. 403/150, 154, 403/155, 97, 157, 263, 408.1, 376; 211/202, 200, 198, 199, 201, 203, 189, 195, 182–183

(56) References Cited

U.S. PATENT DOCUMENTS

| | | |
|---|---|---|
| 482,269 A | 9/1892 | North |
| 2,388,637 A | 11/1945 | John |
| 3,133,645 A | 5/1964 | Cecil |
| 3,236,387 A | 2/1966 | Perini |
| 3,850,534 A | 11/1974 | O'Halloran |
| 3,891,334 A | 6/1975 | Loikitz |
| 3,893,774 A * | 7/1975 | Hashioka .................... 403/171 |
| 3,960,275 A | 6/1976 | Haughton et al. |
| 4,105,348 A * | 8/1978 | Anderson et al. ........... 403/172 |
| 4,270,872 A | 6/1981 | Kiyosawa |
| 4,290,532 A | 9/1981 | Reynolds |
| 4,297,795 A | 11/1981 | Licari |
| 4,308,802 A * | 1/1982 | Munz ......................... 403/367 |
| 4,358,214 A | 11/1982 | Shull |
| 4,435,031 A * | 3/1984 | Black et al. ................. 403/408 |
| 4,556,337 A * | 12/1985 | Marshall ..................... 403/255 |
| 4,828,123 A | 5/1989 | Basore |
| 4,954,032 A * | 9/1990 | Morales ...................... 411/289 |
| 5,135,341 A * | 8/1992 | Leyder .................... 403/408.1 |
| 5,149,149 A | 9/1992 | Wu |
| 5,320,443 A * | 6/1994 | Lien et al. ................... 403/154 |
| 5,393,162 A * | 2/1995 | Nissen ........................ 403/154 |
| 5,405,828 A * | 4/1995 | Tesney ........................ 403/320 |
| 5,600,870 A * | 2/1997 | Fields et al. ................... 403/97 |
| 5,651,652 A * | 7/1997 | Williams et al. ............. 411/508 |
| 5,772,355 A * | 6/1998 | Ross et al. ................... 403/322 |
| 5,888,012 A | 3/1999 | Nygren, Jr. et al. |
| 6,118,073 A | 9/2000 | Lau et al. |
| 6,155,741 A | 12/2000 | Took |
| 6,238,127 B1 * | 5/2001 | Jhumura et al. ............. 403/282 |
| 6,279,754 B1 * | 8/2001 | Hoss et al. .................. 211/182 |

* cited by examiner

*Primary Examiner*—Daniel P. Stodola
*Assistant Examiner*—Jennifer E. Novosad
(74) *Attorney, Agent, or Firm*—Stetina Brunda Garred & Brucker

(57) ABSTRACT

A laundry drying rack has an elongate member having an opening. The laundry drying rack further has a connecting rod having a connecting rod distal end. In an embodiment of the present invention, the laundry drying rack is further provided with an end connector having a resilient pronged end and a post end. A tubular coupling is further provided having a coupling distal end, an opposing coupling proximal end, and an internal ridge formed circumferentially therein. The coupling proximal end receives the connecting rod distal end. The coupling distal end receives the resilient pronged end which the internal ridge for rotatable engagement of the tubular coupling thereabout. In another embodiment of present invention, the laundry drying rack further has a cylindrical connector which has an external groove which engages an elastic retaining ring for connecting the elongate leg member and the connecting rod.

26 Claims, 15 Drawing Sheets

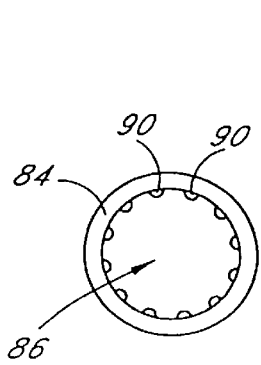 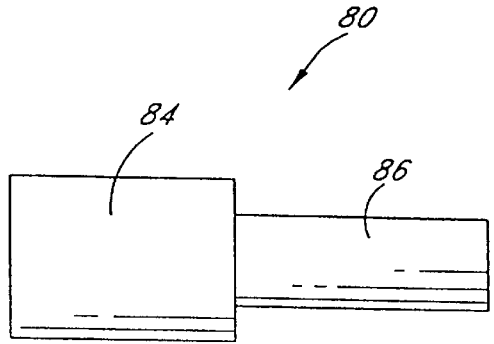 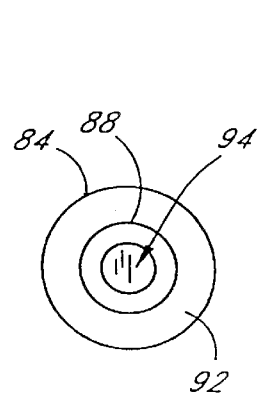
FIG. 12a     FIG. 12b     FIG. 12c
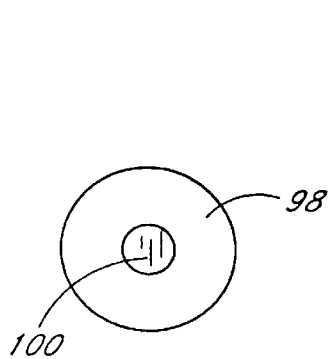 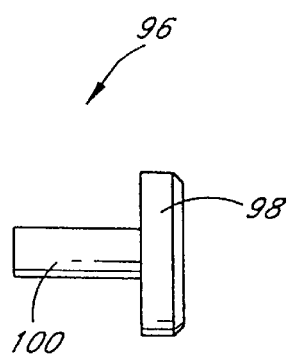 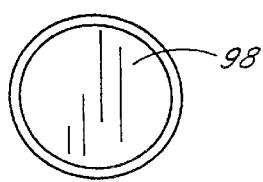
FIG. 13a     FIG. 13b     FIG. 13c

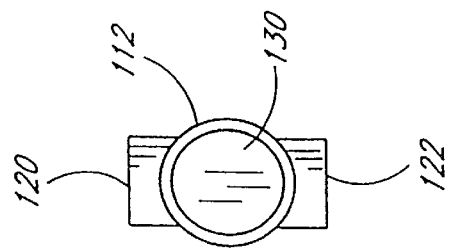
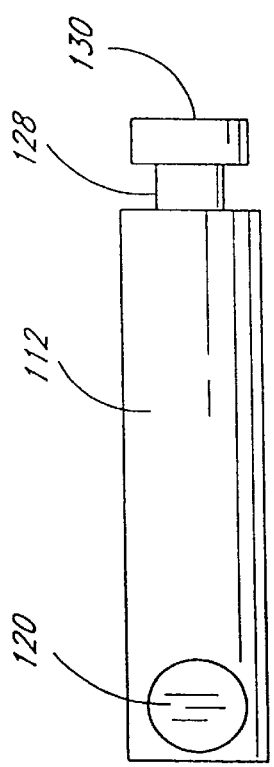
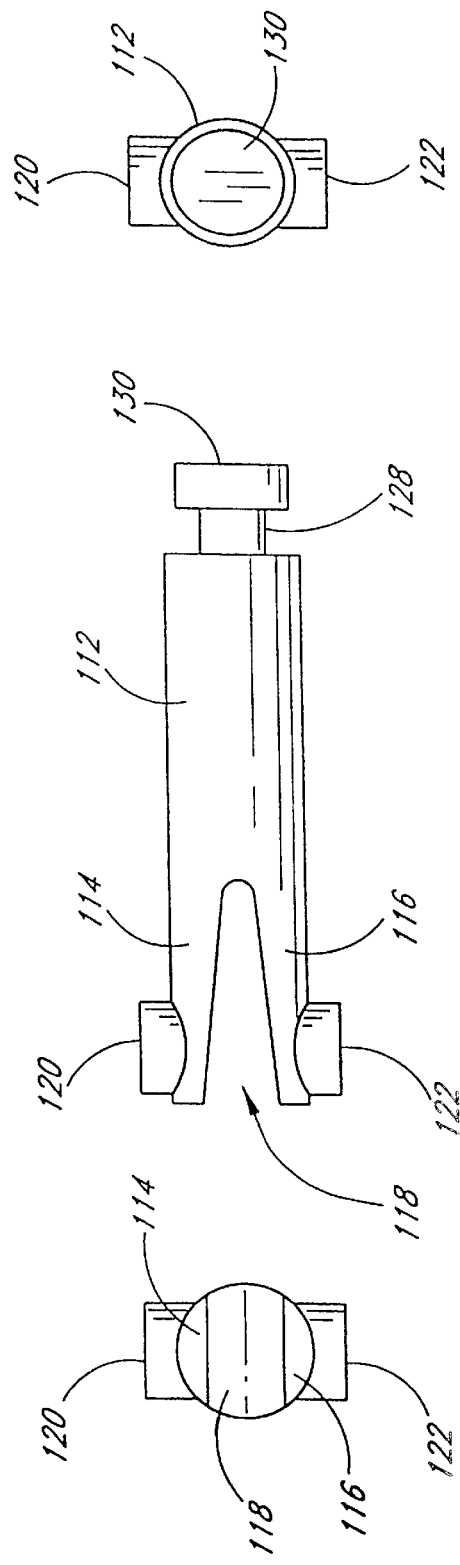
FIG. 17c
FIG. 17d
FIG. 17a
FIG. 17b

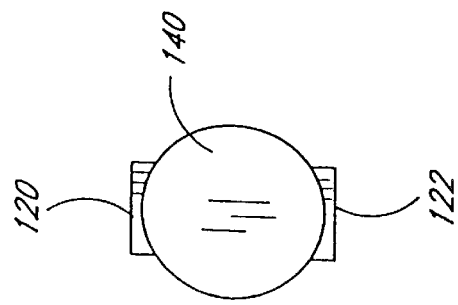
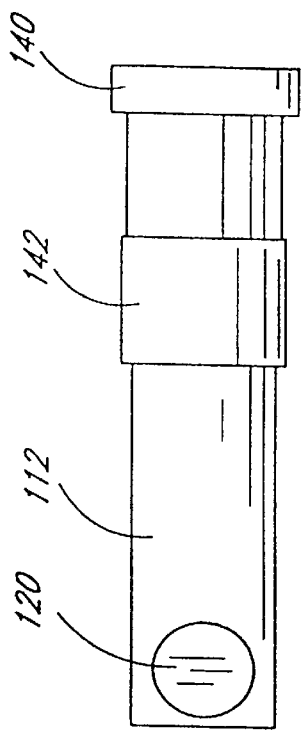
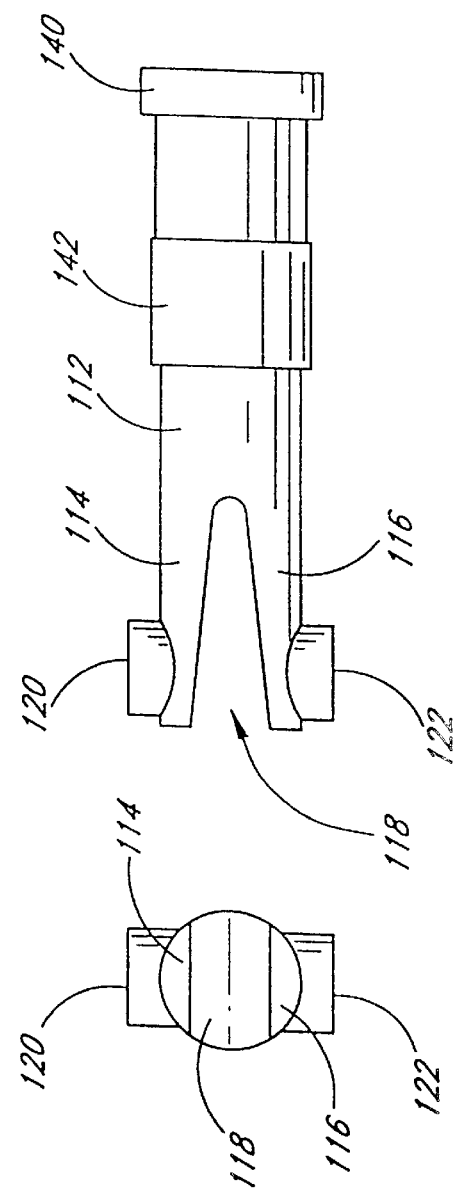
FIG. 21c
FIG. 21d
FIG. 21a
FIG. 21b

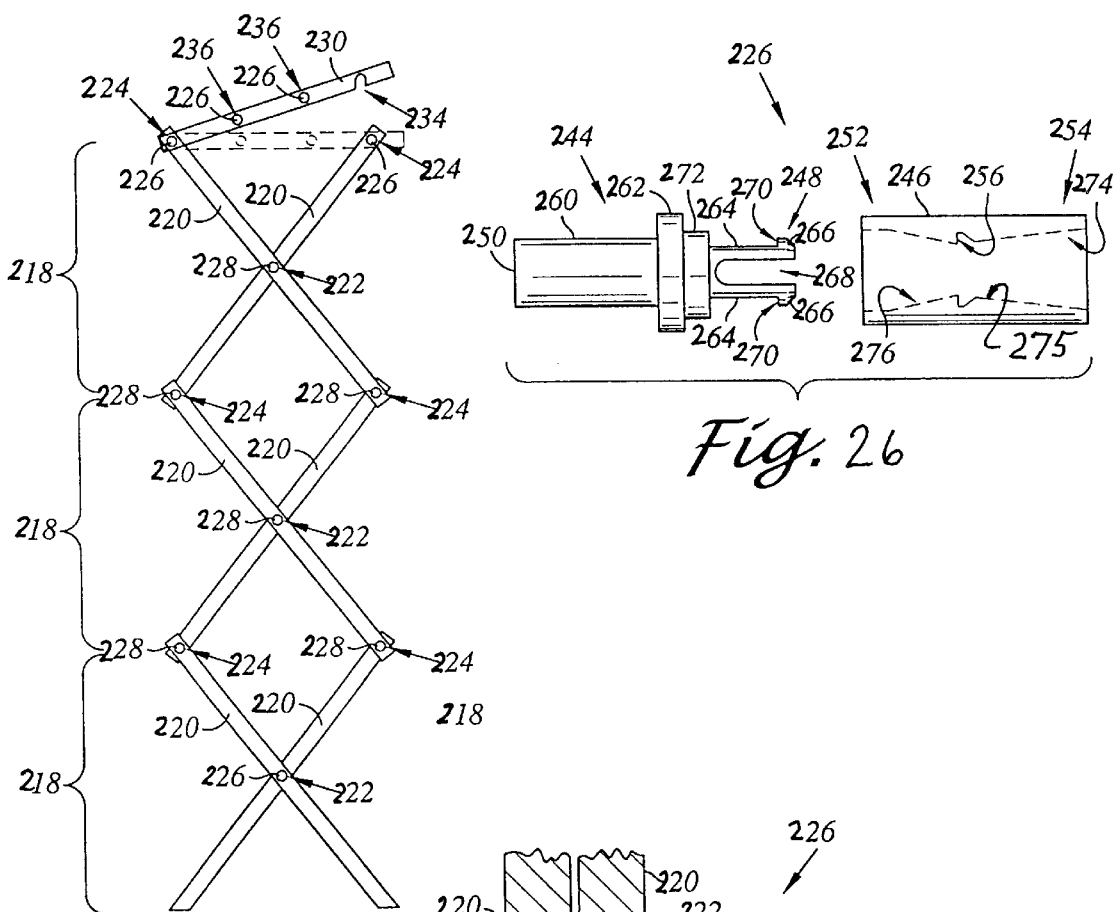
Fig. 26
Fig. 25
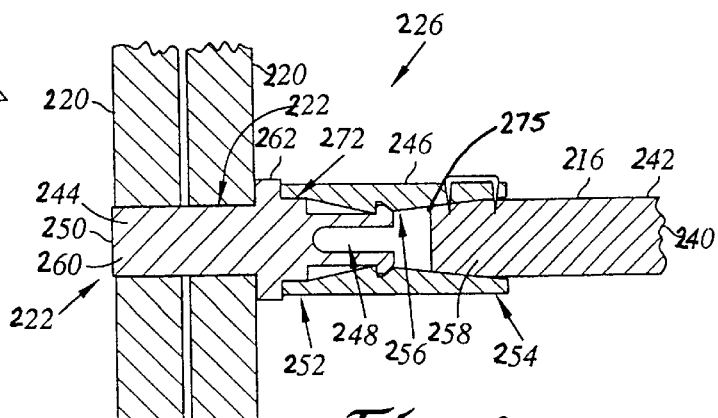
Fig. 27

LAUNDRY DRYING RACK

CROSS-REFERENCE TO RELATED APPLICATIONS

This is a continuation in part of U.S. application Ser. No. 09/483,585, filed Jan. 14, 2000, now abandoned, the entire contents of which are incorporated herein by reference, which is a continuation in part of U.S. application Ser. No. 09/233,275 filed Jan. 19, 1999, currently pending, the entire contents of which are incorporated herein by reference.

BACKGROUND OF THE INVENTION

The present invention relates generally to laundry drying racks, and more particularly to a laundry drying rack having collapsible legs.

Conventional laundry drying racks are used to dry laundered items. Laundry drying racks have particular application when the laundered items are too delicate to be placed in an electric dryer or may shrink therein. Laundry drying racks may also be used for temporary storage such as during folding or ironing tasks.

In order to minimize the costs of such laundry drying racks to end consumers, it is desirable that the laundry drying racks be shipped and packaged in a disassembled state. Such disassembly allows for the components of such laundry drying rack to be compactly packaged thereby lowering shipping costs. Further avoidance of assembly by the manufacturer avoids the associated assembly costs, the saving of which may be passed along to the consumer. Conventional laundry drying racks, however, frequently comprise numerous components which makes assembly difficult and time consuming. Further, use of fasteners for the assembly may further require tools for the attachment thereof.

Accordingly, there is a need in the art for an improved laundry drying rack which is structurally stable, easy to assemble, and has components which are relatively low in cost to manufacture, in comparison to the prior art.

SUMMARY OF THE INVENTION

In accordance with an embodiment of the present invention, there is provided a laundry drying rack. The laundry drying rack has an elongate leg member having an opening formed laterally therein. The laundry drying rack is further provided with a connecting rod having a connecting rod distal end thereof. The laundry drying rack is further provided with an end connector having a resilient pronged end and a post end. The post end is sized and configured to extend within the opening of the elongate leg member for rotatably connecting the elongate leg member to the end connector. The laundry drying rack is further provided with a tubular coupling having a coupling distal end, an opposing coupling proximal end, and an internal ridge formed circumferentially therein. The coupling proximal end is sized and configured to axially receive the connecting rod distal end therein. The coupling distal end is sized and configured to axially receive the resilient pronged end of the end connector therein. The internal ridge is sized and configured to concentrically engage the resilient pronged end of the end connector for rotatable engagement of the tubular coupling thereabout.

In the preferred embodiment of the present invention, the post end of the end connector has a post. The post is sized and configured to extend within the opening of the elongate leg member for radially connecting the elongate leg member to the end connector. The post may be sized and configured for press-fit engagement with the opening of the elongate leg member. Further, the end connector may have a radially extending flange disposed between the resilient pronged end and the post end. The flange is sized and configured to abut the elongate leg member adjacent the opening when the post end is extended therewithin. The flange is further sized and configured to abut the coupling distal end when the resilient pronged end is axially received therewithin.

The resilient pronged end of the end connector preferably has a pair of resilient prongs, the resilient prongs are sized and configured to expand radially outward to engage the tubular coupling adjacent the internal ridge when axially received within the coupling distal end. The resilient prongs comprise opposing sides of a cylindrical member having a lengthwise slot defining the resilient prongs in spaced relation thereto. The resilient prongs are sized and configured to contract radially inward within the lengthwise slot during axial insertion into the coupling distal end. The resilient prongs each terminate with a prong head thereof. The prong heads each have an engagement surface for engaging the tubular coupling adjacent the internal ridge when the pronged end is axially received within the coupling distal end. The coupling distal end of the tubular coupling has a distal end inner surface tapering towards and terminating at the internal ridge. The resilient prongs are sized and configured to contract radially inward in slidable engagement with the distal end inner surface during axial insertion into the coupling distal end.

In addition, the coupling distal end of the tubular coupling may have a distal end inner surface tapering towards and terminating at the internal ridge. The resilient pronged end of the end connector is sized and configured to contract radially inward in slidable engagement with the distal end inner surface during insertion thereof into the coupling distal end. The end connector may have a plug which is sized and configured to extend within the coupling distal end when the pronged end is axially received within the coupling distal end. The plug is sized and configured to engage the coupling distal end in press-fit engagement therewith. The coupling proximal end may be sized and configured to engage the connecting rod distal end in press-fit engagement therewith. The coupling proximal end has a proximal end inner surface tapering towards the coupling distal end for axially receiving the connecting rod distal end in press-fit engagement.

The laundry drying rack may further include a second elongate leg member having an opening formed laterally therein. The post end of the end connector is sized and configured to extend within the openings of the leg members for rotatably connecting the leg members to each other. The elongate leg members cooperatively forming a collapsible leg of the laundry drying rack. The opening of each elongate leg member may be disposed adjacent a respective distal end thereof. The opening of each elongate leg member may alternately be disposed adjacent a center segment thereof.

In another embodiment of the present invention, there is provided a laundry drying rack having an elongate leg member having an opening formed laterally therein. The laundry drying rack is further provided with a connecting rod having a connecting rod distal end thereof. The laundry drying rack is further provided with a cylindrical connector having an open end, an opposing flanged end, and a post section disposed therebetween. The open end has a recess formed therein extending axially toward the flanged end. The recess is sized and configured to axially receive the connecting rod distal end therein for engagement of the cylindrical connector to the connecting rod. The flanged end has a flange extending radially therefrom. The post section is sized and configured to extend through the opening of the elongate leg member with the flange abutting the elongate leg member adjacent the opening. The post section has an external groove circumferentially formed therein. The laundry drying rack further has an elastic retaining ring sized and configured to receive the open end of the cylindrical connector therethrough. The elastic retaining ring is further sized and configured to concentrically engage the external groove, for capturing the elongate leg member between the flange and the elastic retaining ring about the post section.

Preferably, the cylindrical connector is sized and configured to engage the connecting rod distal end in press-fit engagement therewith. The recess is tapered toward the flanged end for axially receiving the connecting rod distal end in press-fit engagement. Further, the cylindrical connector has an outer surface tapering from the external groove towards the open end for receiving the retaining ring thereover. The elastic retaining ring may be sized and configured to radially expand in slidable engagement over the outer surface of the cylindrical connector towards the external groove. The elastic retaining ring has ring inner surface tapering towards the open end of the cylindrical connector when the elastic retaining ring is engaged with the external groove.

The laundry drying rack may further include a second elongate leg member having an opening formed laterally therein. The post section is sized and configured to extend within the openings of the leg members for rotatably connecting the leg members to each other. The elongate leg members cooperatively form a collapsible leg of the laundry drying rack. The opening of each elongate leg member is disposed adjacent a respective distal end thereof. The opening of each elongate leg member may alternately be disposed adjacent a center segment thereof.

As such, based on the foregoing, the present invention is believed to mitigate the inefficiencies and limitations associated with prior art laundry drying racks. Accordingly, the present invention represents a significant advance in the art. This advancement will be better appreciated in view of the following discussion and drawings in which like numbers refer to like parts through.

BRIEF DESCRIPTION OF THE DRAWINGS

The appended drawings contain figures of preferred embodiments of the present laundry stand. The above-mentioned features of the laundry stand, as well as other features, will be described in connection with the preferred embodiments; however, the illustrated embodiments are only intended to illustrate the invention and not to limit the invention. The drawings contain the following figures:

FIG. 7a is a front view of the body of the connector shown in FIG. 4;

FIG. 7b is a side view of the body of the connector shown in FIG. 7a;

FIG. 7c is a back view of the body of the connector shown in FIG. 7a;

FIG. 8a is a front view in of the connector shown in FIG. 4;

FIG. 8b is a side of the pin of the connector shown in FIG. 8a;

FIG. 8c is a back view of the pin of the connector shown in FIG. 8a;

FIG. 12a is a front view of the body of the connector shown in FIG. 9;

FIG. 12b is a side view of the body of the connector shown in FIG. 12a;

FIG. 12c is a back view of the body of the connector shown in FIG. 12a;

FIG. 13a is a front view of the pin of the connector shown in FIG. 9;

FIG. 13b is a side view of the pin of the connector shown in FIG. 13a;

FIG. 13c is a back view of the pin of the connector shown in FIG. 13a;

FIG. 17a is a front view of the body of the connector shown in FIG. 14;

FIG. 17b is a left side view of the connector shown in FIG. 17a;

FIG. 17c is a right side view of the connector shown in FIG. 17a;

FIG. 17d is top view of the body of the connector shown in FIG. 17a;

FIG. 21a is a front view of the body of the connector shown in FIG. 18;

FIG. 21b is a left side view of the connector shown in FIG. 21a;

FIG. 21c is a right side view of the connectors shown in FIG. 21a;

FIG. 21d is top view of the body of the connector shown FIG. 21a;

FIG. 25 is a side view of the laundry drying rack of FIG. 24B

FIG. 26 is a side view of a disengaged end connector s of an aspect of the present invention;

FIG. 27 is a cross-sectional side view of an end connector set as shown engaged with a connecting rod (partially depicted) and leg members (partially depicted) of the laundry drying rack of FIG. 24B as seen along axis 24B—24B;

DETAILED DESCRIPTION OF THE PREFERRED EMBODIMENT

The present invention involves an improved laundry stand. The principles of the present invention, however, not limited to laundry stands and it will be understood that, in light of the present disclosure, the laundry stand disclosed herein can be successfully used in connection with other types of stands and supports.

Additionally, to assist in the description of the components of the laundry stand, words such as left, right, up, down, front and rear are used to describe the accompanying figures. It will be appreciated, however, that the laundry stand can be located in a variety of different positions and orientations—including at various angles, sideways and even upside down. A detailed description of the laundry stand now follows.

Figure 1:
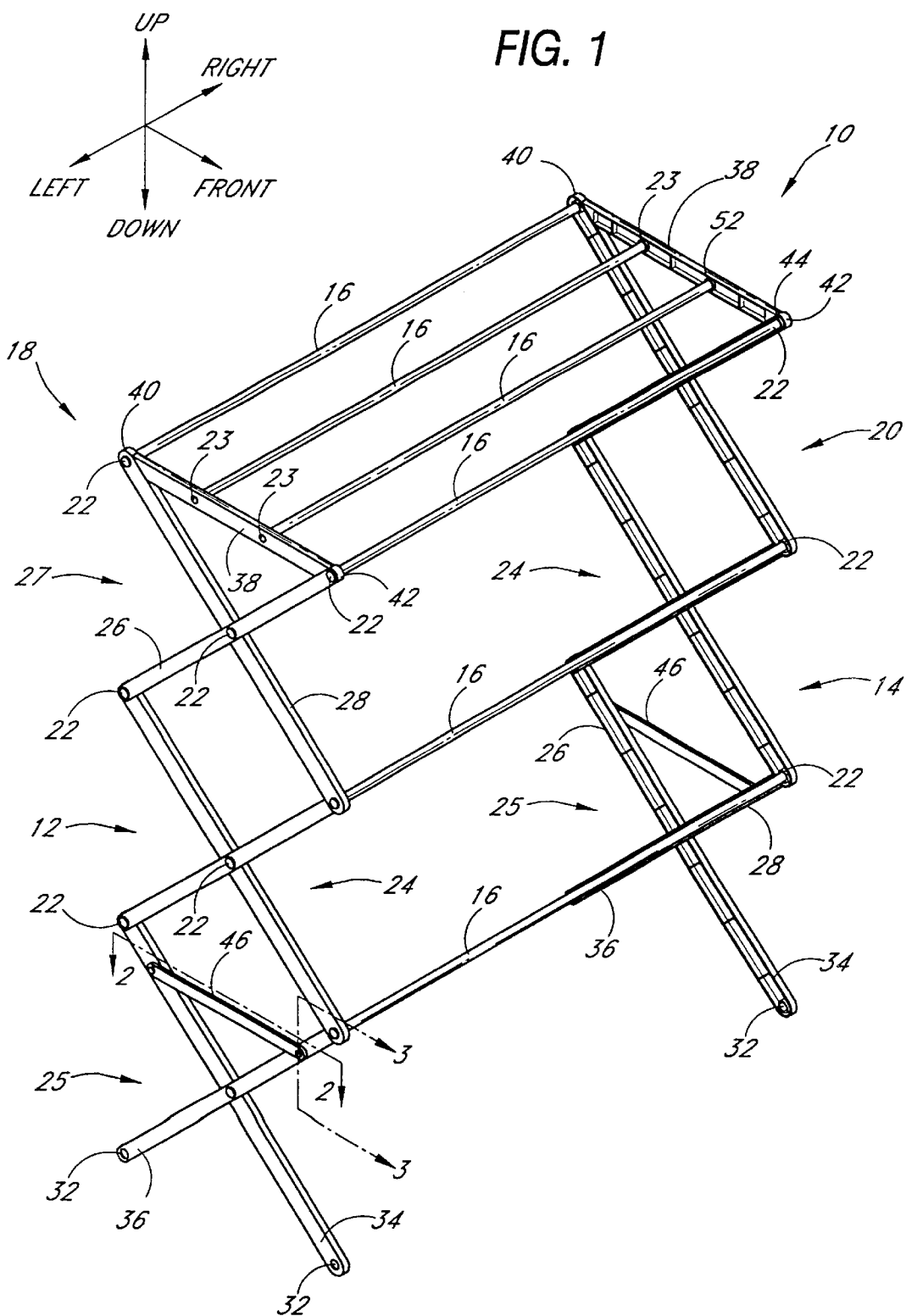
FIG. 1 is a perspective view of the laundry stand in accordance with a preferred embodiment of the present invention.

FIG. 1 illustrates a preferred embodiment of the laundry stand 10. In general, the laundry stand 10 includes oppositely disposed first and second legs 12 and 14 which are interconnected by one or more connecting rods 16. As described below, the connecting rods 16 may be attached to the upper portion 18 and/or lower portion 20 of the laundry stand 10. The legs 12 and 14 are preferably fastened together by connectors 22 that are advantageously configured to receive an end of the connecting rods 16. It will be understood that the connector 22 is used to generally refer to any of the various connectors used in conjunction with the laundry stand 10 and in particular to the connectors 50, 80, and 100 described in more detail below.

Figure 4:
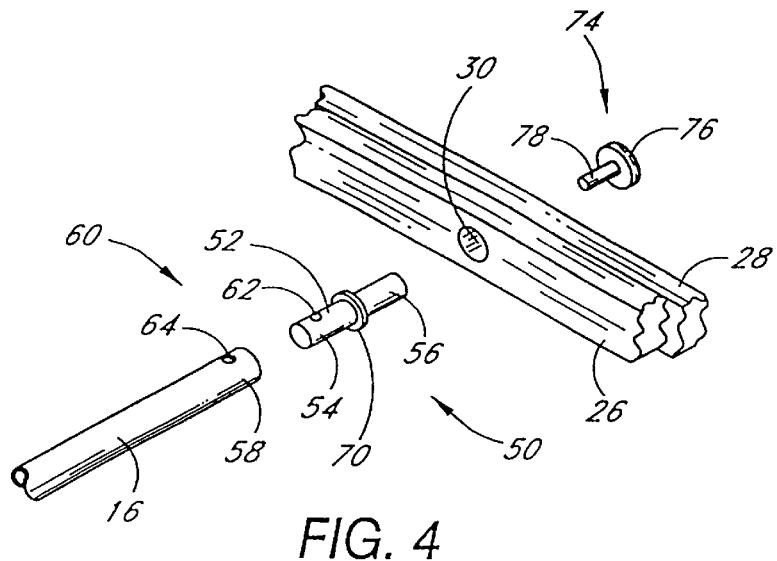
FIG. 4 is an exploded, enlarged perspective view of a preferred embodiment of a connector configured to extend through two leg members or a leg member and a cross bar.
Figure 9:
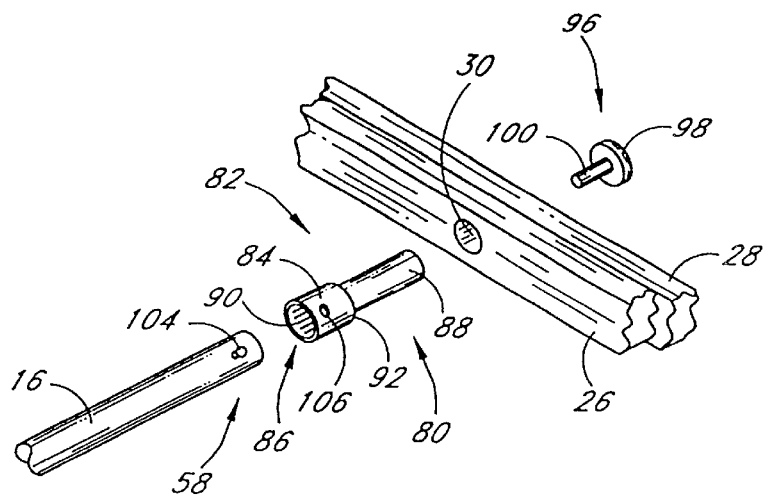
FIG. 9 is an exploded, enlarged perspective view of another preferred embodiment of a connector, illustrating a connector configured to extend through two leg members or a leg member and a cross bar.
Figure 10:
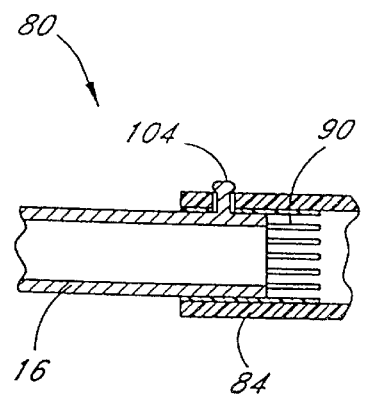
FIG. 10 is a cross sectional side view of the connector shown in FIG. 9 attached to a connecting rod, with a portion of the connector and connecting rod cut away.
Figure 14:
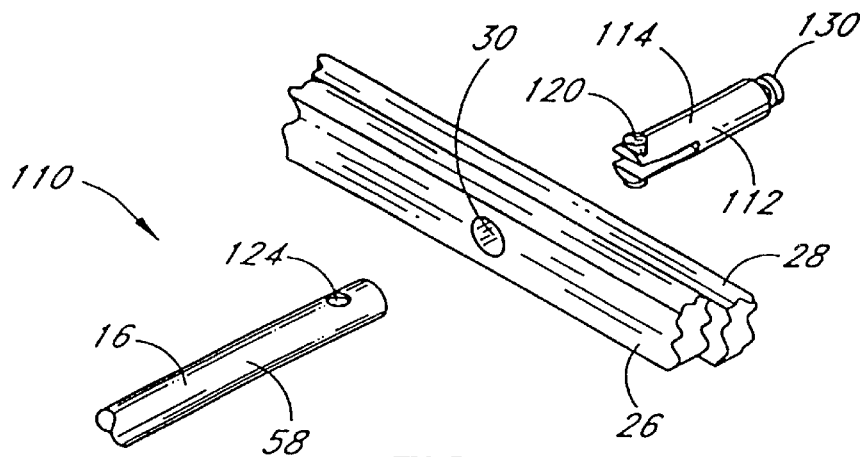
FIG. 14 is an exploded, enlarged perspective view of another preferred embodiment of a connector illustrating a connector configured to extend through two leg members or a leg member and a cross bar.
Figure 15:
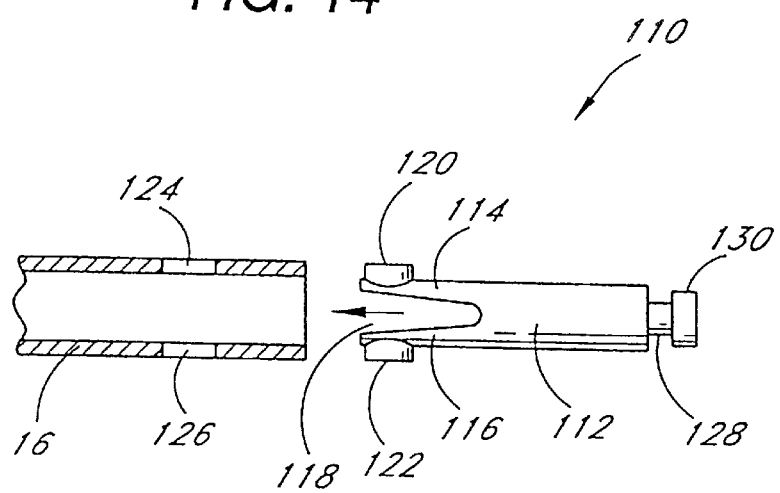
FIG. 15 is a cross sectional side view of the connector shown in FIG. 14 attached to a connecting rod, with a portion of the connecting rod cut away.

In greater detail, the legs 12 and 14 of the laundry stand 10 are preferably foldable or collapsible for purposes such as storage or transport. More preferably, the legs 12 and 14 are scissor linkages 24 which are expandable into an open configuration as shown in FIG. 1 but, as known, the scissor linkages may also be collapsed into a closed position. As seen in FIG. 1, each scissor linkage 24 includes first and second elongated members 26 and 28 which are pivotably connected near the center of the members by a connector 22. As best seen in FIGS. 4, 9 and 14, the elongated members 26 and 28 include an opening 30 located near the middle of each elongated member. In the expanded or open position, the members 26 and 28 are generally aligned at about a right angle to form a generally X-shaped configuration, but the members may also be aligned at other angles. Although not shown in the accompanying figures, in the closed position the members 26 and 28 are placed generally parallel or adjacent to each other. It will be understood that other types of legs, such as straight, curved, telescoping, etc., may be used with the laundry stand 10.

The elongated members 26 and 28 of the scissor linkages 24 are preferably between about 6 inches and 36 inches in length, and more preferably the elongated members are about 19 inches in length, but the members may also be longer or shorter. The elongated members 26 and 28 preferably have a body portion having a width of about ⅞ of an inch and legs having a length of about ½ of an inch, but the members may have any desired configuration and dimensions depending, for example, upon the type of material used to construct the members and the intended use of the laundry stand 10.

The components of the laundry stand 10 are preferably constructed from plastic, and more preferably from a thermoplastic resin such as polyvinyl chloride (PVC), but other types of plastics such as polyethylene, polypropylene or ABS may also be used. The plastic components are preferably designed to withstand temperatures of over 120°F. so that the stand does not melt or deform it when used outdoors and the plastic is preferably treated by known means to resist damage from the sun, including protection from ultraviolet (UV) and infrared radiation. Advantageously, the plastic components increase the life expectancy of the laundry stand 10 and the stand can be used both indoors and outdoors. It will be understood that the laundry stand 10 can also be constructed from other types of plastics and other materials such metals or composites. As discussed below, the stand 10 may also include components constructed of wood.

As seen in FIG. 1, scissor linkages 24 are pivotably fastened together by connectors 22 to form the first leg 12 and the second leg 14. The multiple scissor linkages 24 are interconnected by inserting a connector 22 through aligned openings 32 located near the ends of the elongated members 26 and 28. The connectors 22 thus pivotably connect the scissor linkages 24. For example, as seen in FIG. 1, the first leg 12 and second leg 14 include three interconnected scissor linkages 24 with a lower scissor linkage 25 and an upper scissor linkage 27, but the legs may have more or fewer scissor linkages. The lower ends 34 and 36 of the lowermost scissor linkages 25 include openings 32 but these openings are not used because this portion of the scissor linkage contacts a support surface and it is not connected to another scissor linkage.

Figure 16:
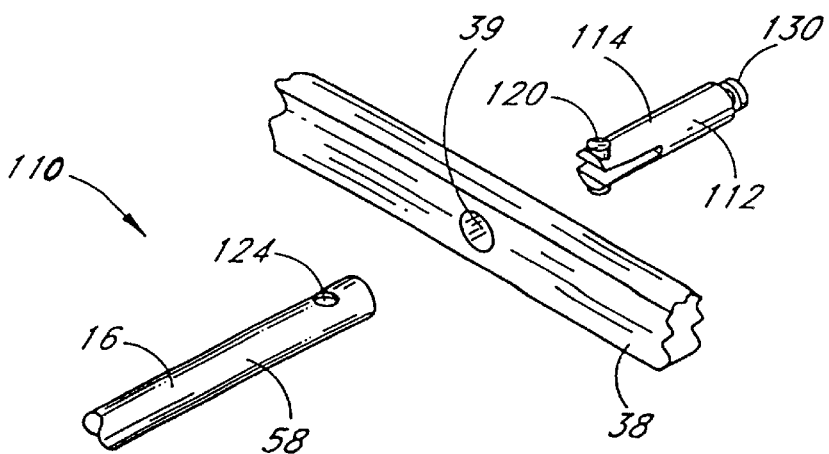
FIG. 16 is an exploded, enlarged perspective view of a portion of the connector shown in FIG. 14, illustrating a connector configured to extend through the cross bar.
Figure 18:
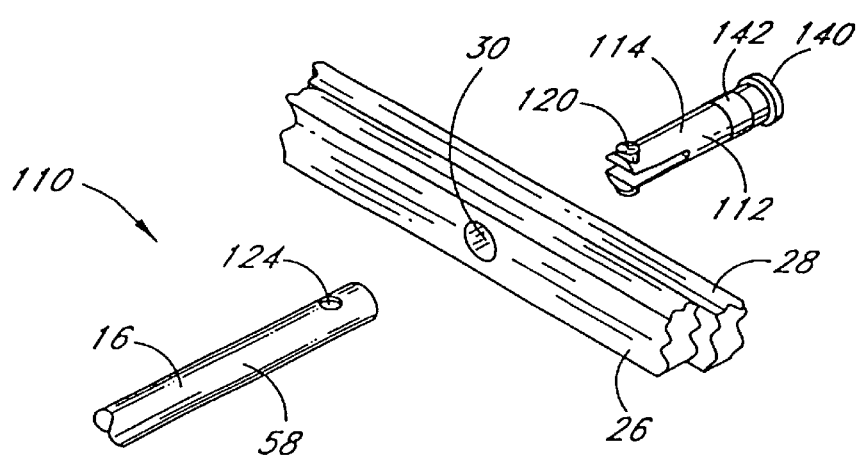
FIG. 18 is an exploded, enlarged perspective view of another preferred embodiment of a connector, illustrating a connector configured to extend through two leg members or a leg member and a bar.
Figure 19:
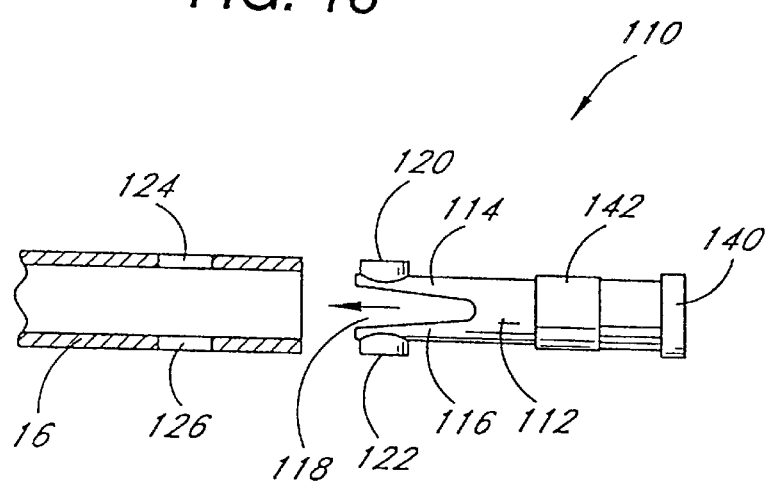
FIG. 19 is a cross sectional side view of the connector shown in FIG. 18 attached to a connecting rod, with a portion of the connecting rod cut away.
Figure 20:
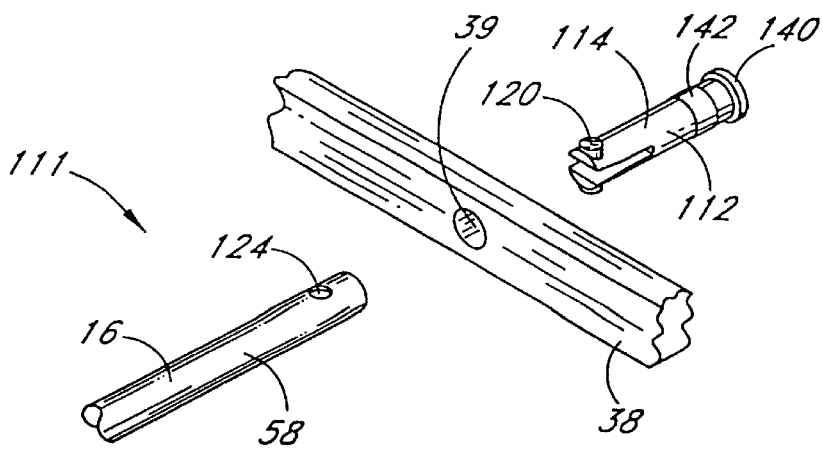
FIG. 20 is an exploded, enlarged perspective view of a portion of the connector shown in FIG. 18, illustrating a connector configured to extend through the cross bar.

The distal ends of elongated members 26 and 28 of the uppermost scissor linkages 27 are joined by cross bars 38. The cross bars 38 are preferably about 14 inches in length and the cross bars have a generally C-shaped cross section with a body portion having a width of about ⅞ of an inch and legs have a length of about ½ of an inch, but the cross bars may have different configurations and dimensions. Each cross bar 38 preferably includes one or more openings 39 (shown in FIGS. 6, 11 and 16) which are spaced apart at a predetermined interval. More preferably, the openings 39 in the cross bar 38 attached to the first leg 12 are generally aligned with the openings in the cross bar attached to the second leg 14.

The cross bar 38, when it is connected to the distal ends of the elongated members 26 and 28, holds the scissor linkage 24 in the open position. On the other hand, when the cross bar 38 is disconnected from one or both ends of the elongated members 26 and 28, the scissor linkages 24 may collapse into a closed position.

There are several ways to connect the cross bars 38 to the distal ends of the scissor linkages 26 and 28. For example, in one embodiment, the first end 40 of the cross bar 38 may be pivotably connected to the end of the elongated member 28 of the uppermost scissor linkage 27 by a connector 22. The second end 42 of the cross bar 38 includes a downwardly extending generally U-shaped cutout section 44 configured to be placed over and in contact with connector 22 attached to the end of the elongated member 26 of the uppermost scissor linkage 27. Advantageously, the cutout section 44 has a narrower opening that is sized to snap over the piece inserted into the cutout section 44 and lock into place. In another embodiment, the cross bar 38 can include an opening rather than a cutout section 44 and the second end 42 of the cross bar can be connected by a connector 22 to the uppermost scissor linkage 27. In yet another embodiment, the distal ends 40 and 42 of cross bars 38 can include openings which are aligned with openings 32 at the ends of the linkages 26 and 28. An interlocking snap fastener, such as the fastener 48 described below, can be inserted through the aligned openings to connect the cross bar 48 to the linkages 26 and 28. In still another embodiment, the distal ends of cross bars 38 can be angled as shown in FIG. 1 to conform to the angle of inclination of the scissor linkages 26, 28, with an interlocking snap fastener 48 of the type described below passing through a hole in the edge of ends 40, 42 of linkages 26, 28.

Figure 2:
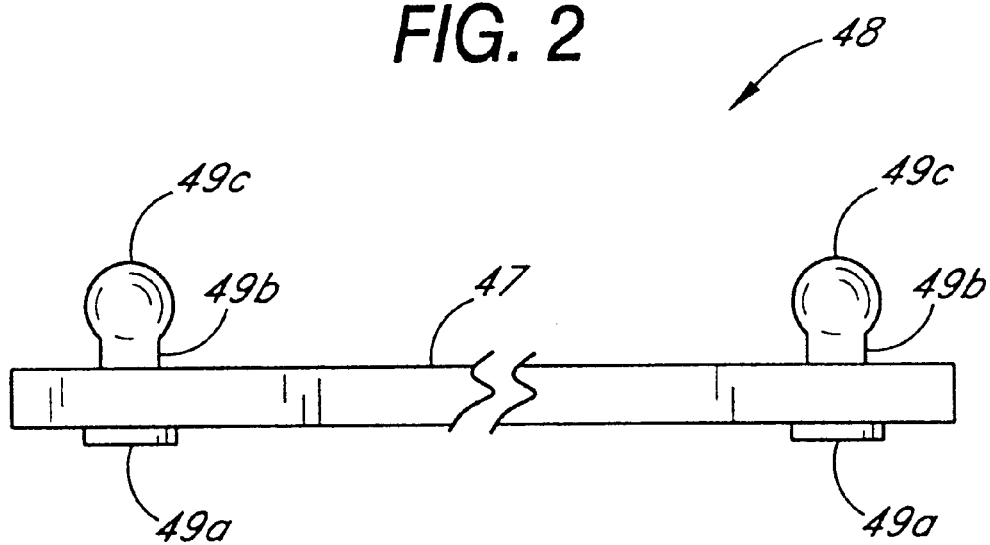
FIG. 2 is an enlarged top view along lines 2—2 of a portion of the laundry stand shown in FIG. 1, illustrating the latching leg.
Figure 3:
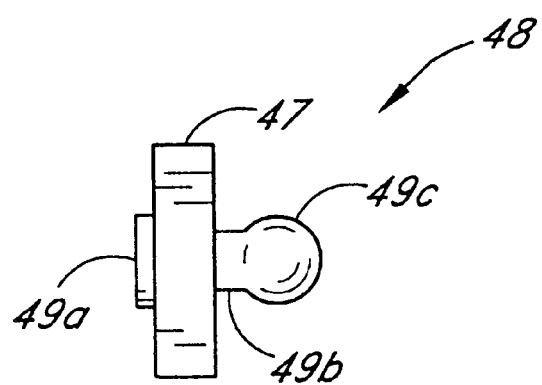
FIG. 3 is an enlarged cross sectional side view along lines 3—3 of a portion of the laundry stand in FIG. 1, illustrating a portion of the latching leg.

As shown in FIGS. 1–3, the elongated members 26 and 28 of the lower scissor linkages 25 are interconnected by a latching leg 46 to further secure the legs in the desired position. In particular, the distal ends of the latching leg 46 are connected to the elongated members 26 and 28 of the scissor linkage 25 by a fastener 48. As best seen in FIGS. 2–3, the fastener 48 includes a body 49b with a head 49a at one end and an enlarged projection or bulb 49c located at the other end. The fastener 48 is sized and configured to allow the body 49b and bulb 49c to be inserted through an opening in the latching leg 46 and a corresponding opening in the elongated members 26 or 28, but the head 49a is sized larger than the openings to prevent the fastener 48 from passing through the openings. Because the bulb 49c is sized slightly larger than the openings, the latching leg 46 is snap connected to the cross members 26 and 28 of the scissor linkage 25 to securely lock the leg 12 into position. It will be understood that any type of desired fastener including, for example, the fasteners used to connect cross bars 38 and elongated members 26, 28 (and vice versa), threaded fasteners such as bolts and screws, etc. may be used to connect the latching leg 46 to the legs 12 and/or 14. Additionally, fasteners could be integrally formed as part of the latching leg 46.

The latching leg 46 is desirably about 8 inches in length, and it has a generally rectangular cross section with a width of about ¾ of an inch and a thickness of about ⅜ of an inch, but the leg may have any desired size and shape. As shown in FIG. 1, the latching leg 46 is attached about 4 inches above the intersection of the elongated members 26 and 28 of the lowermost scissor linkage 25 of the first leg 12, but the latching leg may be attached in any desired portion and to any of the scissor linkages. It will be appreciated that the latching leg 47 may be attached to either or both legs 12 and 14, but the latching leg is not required.

The connecting rods 16 which interconnect the first leg 12 and the second leg 14 are preferably between about 12 inches and 60 inches in length and more preferably about 29 inches in length, but the connecting rods may be longer or shorter. The connecting rods 16 are preferably plastic tubes with walls about 1/16 of an inch thick and the rods have an outside diameter of about ⅜ of an inch, but the rods may have any desired configuration and size. The connecting rods 16 are preferably hollow tubes for decreased weight, but the rods may also be solid for increased strength. Additionally, the rods 16 have a generally smooth cylindrical exterior surface to prevent laundry from snagging or catching on the rods. Alternatively, the rods 16 may have any desired shape, such as square or rectangular, and the rods may be constructed from other materials such as wood or metal. The rods 16 may also include a coating or layer of material, for example, to help prevent laundry from catching or snagging on the rods.

The components of the laundry stand 10, including the connecting rods 16, elongated members 26 and 28, latching leg 46 and connectors 22, desirably fit into a small bag or enclosure for shipping and storage. For example, if the stand 10 is unassembled, the components will fit into a bag having a length of about a 30 inch length and a width of about 5 inches and about a 3 inch height. Additionally, if the stand 10 is partially assembled with the scissor linkages 24 interconnected to form the legs 12 and 14, the components of the stand will fit into a bag having a length of about 30 inches, a width of about 20 inches and a height of about 5 inches. Because the unassembled or partially assembled stand fits within a small, compact bag or enclosure, this significantly reduces shipping, transportation and storage costs.

The connectors 22 allow the connecting rods 16 to connect the legs 12 and 14 in a variety of different locations. As seen in FIG. 1, for example, an exemplary connecting rods 16 are shown on the front edge of the lower portion 20 of the stand and four connecting rods extend across the upper portion 18 of the stand, but any number of connecting rods may be positioned between any generally aligned connectors 22. Advantageously, this allows laundry to be supported in a variety of different locations and, for example, at different distance from the support surface.

Figure 5:
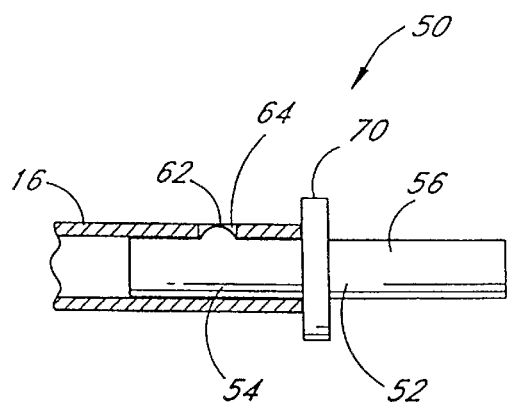
FIG. 5 is a cross sectional side view of the connector shown in FIG. 4 attached to a connecting rod, with a portion of the connecting rod cut away.
Figure 6:
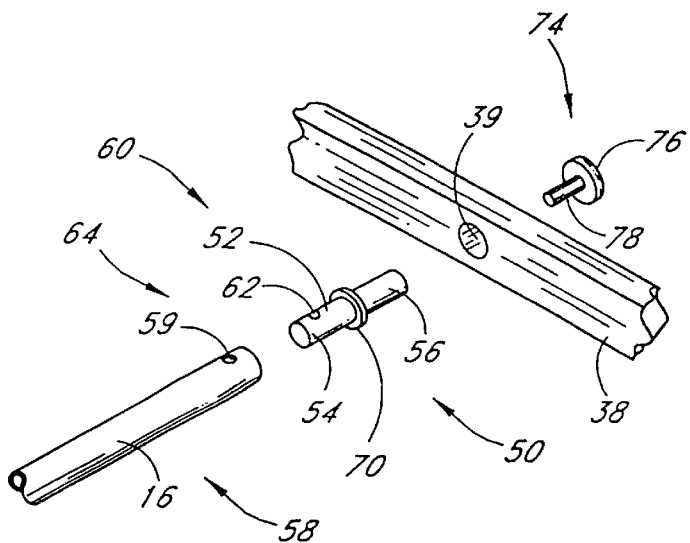
FIG. 6 is an exploded, enlarged perspective view of the connector shown in FIG. 4, illustrating a connector configured to extend through the cross bar.
Figures 7A, 7B, 7C:
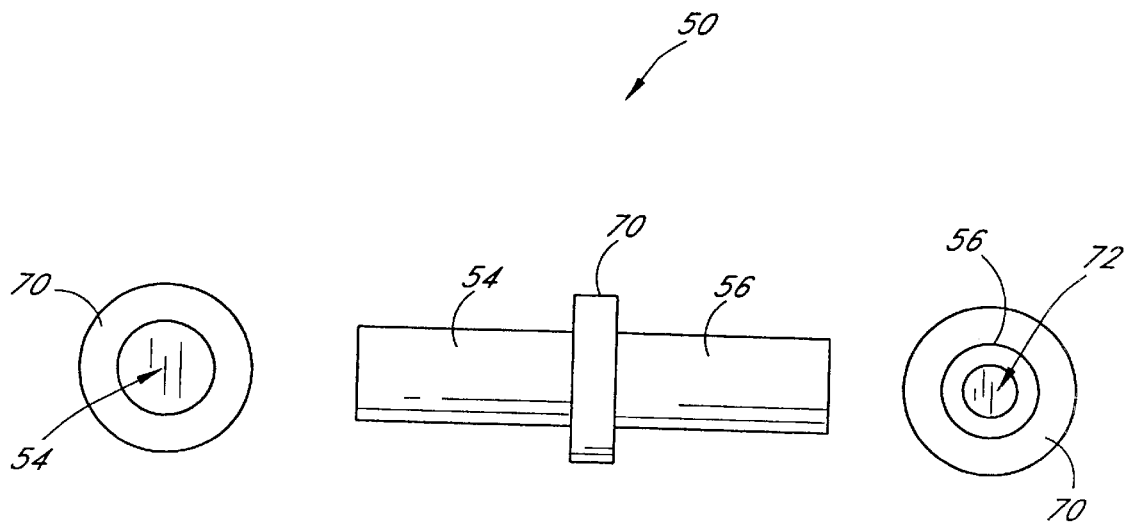
Figures 8A, 8B, 8C:
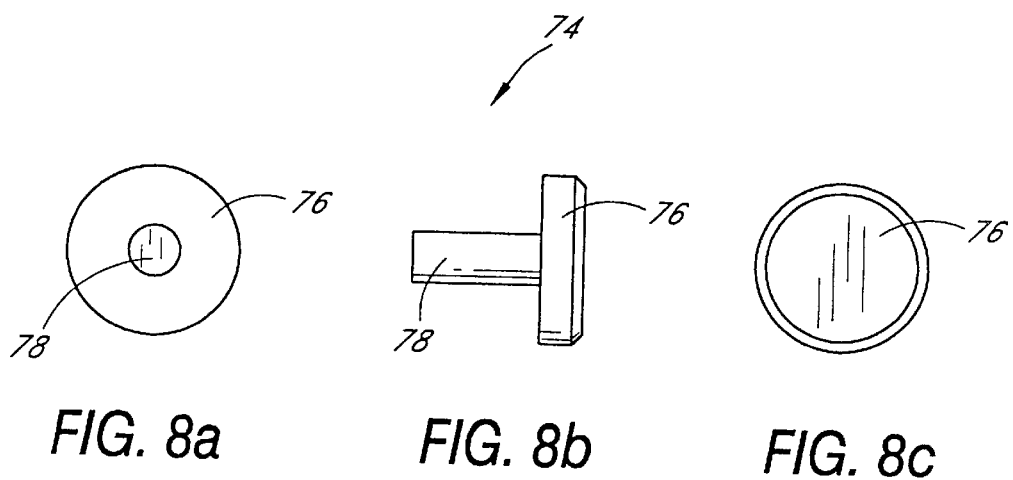

As seen in FIGS. 4–6, a preferred embodiment of the connector 22 used in conjunction with the laundry stand 10 is a connector 50. The connector 50 includes an elongated body 52 with a first end 54 and a second end 56. The first end 54 is sized and configured to be inserted into the end 58 of the connecting rod 16. The connecting rod 16 and connector 50 are preferably interconnected by a friction or interference fit and, more preferably, a fastener 60 is used to securely connect the rod and the connector. The fastener 60, comprises a projection or protuberance 62 which extends radially outwardly from the connector 50 and the end 58 of the rod 16 includes an opening or detent 64 configured to receive the protuberance. The positioning of the protuberance 62 in the opening 64 securely connects or locks the rod 16 to the connector 50, but it will be appreciated that the rod and connector may be attached by any known means, such as bolts, screws, adhesives, etc. Advantageously, while the fastener 60 securely attaches the connector 50 and the rod 16, the fastener is releasable to permit disassembly of the laundry stand 10.

The connector 50 also has a second end 56 which is configured to be inserted through aligned openings 30 formed in a pair of adjacent elongated members 26 and 28 (as seen in FIG. 4) to form a scissor linkage; or the connector can be inserted through aligned openings 32 located near the distal ends of a pair of elongated members to interconnect a pair of scissor linkages (as seen in FIG. 1). The second end 36 of the connector 50 may also be configured to extend through an opening 32 at a distal end of an elongated member 16 and through an aligned opening 51 in the cross bar 38 (as seen in the upper portion of FIG. 1). Alternatively, the second end 56 of the connector 50 may be configured to extend through an opening 39 in a cross bar 38 (as seen in FIG. 6).

The first end 54 of the connector 50 preferably has a length of about ⅝ of an inch and an outside diameter of about ¼ of an inch, and this first end is sized and configured to be inserted into the end 58 of the connecting rod 16. The second end 56 of the connector 50 has a length of about 3/14 of an inch and an outside diameter of about ¼ of an inch which is configured to be inserted through an aligned pair of openings 30, 32 or single opening 39 as discussed above. A flange or collar 70 with an outside diameter of about ½ of an inch divides the connector 50 into the first end 54 and second end 56. The collar 70 advantageously provides a surface which may contact the outer surface of the elongated members 26 or 28 and the end 54 of the rod 16. Preferably the flange or collar 70 extends around the entire periphery of the connector 22, but need not do so. The flange 70 is advantageously configured to prevent passage of the flange through openings 30, 32 or 39.

As best seen in FIGS. 4, 6, 7 and 8, the second end 56 of the connector 50 includes an opening 72 configured to receive a locking device such as a fastener 74 with a head 76 and an elongated shaft 78. The opening 72 has a diameter of about ⅛ of an inch and it extends approximately the entire length of the second end 56 of the body 52. The head 76 of the fastener 74 has an outside diameter of about ½ of an inch and the shaft 78 is about ⅛ of an inch in diameter and about ⅜ of an inch in length, but the fastener 74 can have any desired dimensions. The head 76 is preferably sized larger than the opening 30, 32, 39 in the elongated members 26, 28 or cross bar 38 to prevent the fastener 74 from passing through the openings. Alternatively, the head 76 could be shaped differently than the opening so that the head would not normally fit through the opening.

Whether it is the size or the shape of the head 76, the head is configured so that the head does not readily pass through the opening 30, 32, 39 and instead restrains movement of the connector 22. The shaft 78 is configured to be press fit into the opening 72 in the second end 64 of the connector 50, but the elongated shaft of the fastener 74 could be configured to fit over the second end 56 of the connector 50. The fastener 74 allows the connector 50 to be fastened to the pair of elongated members 26 and 28 or an elongated member and cross bar 38 combination, and restrains removal of the members 26 and 28.

Referring to FIG. 4, the second end 56 of the connector 50 is inserted through the opening 30 in members 26 and 28. The shoulder or collar 70 abuts the member 26 to limit motion of the connector 50. The shaft 78 of fastener 74 is inserted into the opening 72 and pressed until it locks, preferably with fastener head 76 abutting the side of member 28, and with collar 70 abutting the opposing side of the member 26, 28 or 38 through which the second end 56 extends. The press fit locks the connector 50 to the members 26 and 28. The end 58 of a connecting rod 16 is then attached to the first end 54 of the connector 50 and the fastener 74 securely locks the connecting rod to the fastener.

The connector 50 may also be configured to extend through a single elongated member 26 or 28, or cross bar 38 as shown in the accompanying FIG. 6. In this embodiment, the second end 56 of the connector 50 has a length of about ½ of an inch or less, depending upon the thickness of the members 26, 28, or 38. This allows the connector 50 to be attached in any desired location to the members 26, 28 and 38. As seen in FIG. 1, for example, fasteners 50 are used to attach two connecting rods 16 to the cross bars 38. It will be appreciated that the fasteners 50 may be placed in any desired location and any number of connecting rods 16 may be used in conjunction with the fasteners.

Thus, the connector 50 includes two opposing ends 54 and 56, preferably with the same outside diameter, one of which mates with connecting rod 16 with the other end extending through a member of one of the scissor legs 12, 14 to engage a fastener 74 that cooperates with flange 70 to prevent removal of the connector from the engaged scissor leg 12, 14.

In a preferred embodiment of constructing the laundry stand, a pair of elongated members 26 and 28 are positioned with the central openings 30 generally aligned. The second end 56 of the elongated body 52 of the connector 50 is inserted through the aligned openings 30 and a fastener 74 is inserted into the opening 72 in the end of the connector to pivotably connect the elongated members 26 and 28 into a scissor linkage 24. Additional scissor linkages 24 are constructed in a similar manner and the scissor linkages are interconnected by additional connectors 50 to form the first leg 12 and second leg 14. The legs 12 and 14 are constructed with the first ends 54 of the connectors 22 pointed in the same direction, and the legs 12 and 14 are positioned with the connectors generally aligned. Cross bars 38 are then attached to the upper portion 18 of the legs 12 and 14 to secure the legs in an open position, and the connecting rods 16 are attached to the first ends 54 of the connectors 50 to connect the first and second legs to form the laundry stand 10.

A disassembled or partially assembled laundry stand can be placed into a small, lightweight bundle for shipping. Advantageously, all parts can be shipped in an unassembled stated. But if desired, the scissor legs 12 and 14 could be assembled and placed with the remaining parts unassembled, for shipping.

It will also be understood that the connector 22 may have other shapes and configurations. For example, the connector 50 may include an end 54 which fits inside the connecting rod 16, but the connector could also have a cavity which fits around the outside of connecting rod 16, with the locking protrusion 62 extending inward instead of outward as shown in FIGS. 4–6. Alternatively, the protrusion 56 could be formed on connecting rod 16 with the engaging aperture or recess being formed on or in one end of connector 22. The press fit of the shaft 78 of the fastener 74 into the opening 72 of connector 22 could also be replaced by an engaging and locking protrusion 62 on either the shaft 78 or end 56, and a recess 64 being formed in either the shaft 78 or end 56. Further, the shaft 78 of fastener 74 is shown as being press fit into a cavity in end 56 of connector 50, but the fastener 74 could be formed to have a hollow end 78 that fits around end 64 of connector 55.

It will be understood that the fastener 74 can all take various forms and shapes. For example, one additional configuration is that shaft 78 could be threaded and cooperate with mating threads on the interior cavity of end 64 of connector 22. Further, the exterior of the end 64 could be threaded and shaft 78 could have internal threads configured to engage the exterior threads on shaft 78.

In a further embodiment of the laundry stand 10, the collar or flange 70 could be omitted so that the connector 22 extends through the hole or opening in the members of one of the scissor ends 12, 14 and is restrained from being pulled toward the opposing scissor member by head 76 of fastener 74, but is not restrained from moving in the opposite direction along the axis of the connecting rod 16.

There is thus advantageously provided a connector 50 for use with a laundry stand 10 in which the connector has a body 52 with a first end 54 and a second end 56. A cavity 72 is in one of the ends, and an outwardly extending flange is placed between the ends. A radially extending protrusion 62 is placed adjacent a distal end of one of the first and second ends. Preferably the first and second ends are cylindrical and of substantially the same diameter. Further, the flange 70 preferably comprises an annular flange and the protrusion 62 extends radially outward from a portion of the first end 54 which is not tubular. There is advantageously a fastener 74 with an enlarged head 76, and with a shaft 78 configured to be press fit into the cavity 72 which is located in the second end 56 of the connector. The second end 56 of the connector body 52 is inserted through an opening in at least one member of a laundry stand 10, and the opening is configured so neither the flange 70 nor the enlarged head 76 of the fastener 74 readily pass through the opening when the shaft of the fastener is inserted into the cavity. Preferably, a connecting rod 16 engages the first end 54 of the connector 50 and the protrusion 62 restrains relative motion of the rod and connector. The protrusion 62 and recess 64 restrain disengagement of the rod 16 and engaged connector 50.

The improved laundry stand 10 also comprises a rack with opposing scissor ends and connector rods 16 extending between the ends, in which there are first means for connecting a first end of the connector 22 to a distal end of the connecting rod and restraining relative motion between, or removal of, the connector and rod after they are connected. There is also provided a second means for connecting a second end of the connector 22 to one of the scissor ends and restraining removal of the second means from the scissor end after they are connected. Advantageously, the first means comprises a cylindrical member having a radial protrusion at a distal end of the member, and the second means comprises a tubular member into which, in the installed configuration, is press fit a mating shaft having an enlarged distal end that remains outside of the tubular member when assembled to the scissor end. As discussed above, other fastening mechanisms can be used for the second means, including threaded connections, pins, stakes, etc., which prevent removal of the connector from the connected members of the laundry stand. The first means is preferably connected to one connecting rod of the laundry stand and the second means is connected to one scissor end of the rack.

There is also advantageously provided a kit for constructing a laundry stand. The kit includes a plurality of connectors 22, each of the connectors having a body with a first annular portion sized to mate with a correspondingly shaped end of a rod 16 of the laundry stand 10. The connectors 22 also have a second annular portion sized to be inserted through an opening in at least one member of the laundry stand 10. Scissor linkages are formed from a plurality of pairs of elongated members having aligned openings through which the connectors 22 can be inserted to pivotably connect the pairs of members to form the scissor linkages. The ends of the scissor linkages have openings through which the connectors can be inserted to join two scissor linkages. At least two scissor linkages are joined to form a first leg, and at least two scissor linkages being joined to form a second leg. A plurality of connecting rods are configured to interconnect the first leg and the second leg by connecting to the connectors.

A plurality of fasteners prevent removal of the connectors. The fasteners advantageously have a shaft configured to engage the second end of the connectors, with an enlarged head on the shaft being configured to restrain passage through the holes. Similarly, there is advantageously a protrusion on one of the rod or connector and a recess on the other of the rod or connector, with the protrusion and recess being configured and located so that when assembled the protrusion enters the recess to restrain relative motion between the connector and rod. This also restrains removal of the engaged rod and connector. Preferably, the kit further includes a cross bar configured to be connected to distal ends of a scissor linkage on one of the legs. This helps to prevent the laundry stand from collapsing, as does a latching leg configured to be attached to two members of a scissor linkage—which is also preferably included in the kit.

Another aspect of this invention includes a method for constructing a laundry stand 10. The method includes the steps of connecting a plurality of pairs of elongated members having aligned holes by placing connectors through the holes to pivotably connect the pairs of members and form scissor linkages. Ends of the scissor linkages are connected by placing connectors through holes in the ends to join two adjacent scissor linkages. At least two scissor linkages are joined to form a first leg, and at least two scissor linkages being joined to form a second, opposing leg. A plurality of the connectors 22 on one leg have a free end extending toward the opposing leg and are alignable with a free end of a connector on the opposing leg. The connectors 22 are fastened to the joined members to allow rotation of the members and prevent removal of the connectors.

Advantageously, connectors 22 on opposing legs are aligned, and a rod 16 is fastened between a plurality of pairs of the aligned free ends of the connectors. The rods 16 are preferably fastened by having them engage a mating surface of the connector. Preferably the connector 22 has a cylindrical end that fits inside a hollow end of the rod. Desirably, there is a recess on an end of the rod 16 or connector 22 with a protrusion on the other of the rod or connector to restrain the rod from being disengaged. Further, the connectors 22 are fastened to the joined members by placing the joined members between a flange on the connector and a head of a fastener connected to connector, where the flange and head are too large to pass through the holes in the members through which the connector is inserted. This prevents removal of the connector from the scissor legs.

As shown in FIGS. 9–13, another preferred embodiment of the connector 22 used in conjunction with the laundry stand 10 is the connector 80. The connector 80 includes a body portion 82 with a generally cylindrical configuration. The body portion 82 includes a first end 84 with an opening 86 configured to receive the end 58 of connecting rod 16.

The connector 80 also has a second end 88 configured to be inserted through aligned central openings 30 formed in a pair of adjacent elongated members 26, 28 (as seen in FIG. 9); or aligned openings 32 near the ends of a pair of elongated members (as shown in FIG. 1). The second end 88 may also be configured to extend through an opening 32 at an end of an elongated member 16 and an opening 39 in the cross bar 38 (as seen in the upper portion of FIG. 1).

The first end 84 of the connector 80 preferably has a length of about 5/8 of an inch, an outside diameter of about 1/2 of an inch, and an inside diameter of about 3/8 of an inch. Located on the inner surface of the opening 86 in the first end 84 of the body portion 82 are a plurality of inwardly extending ribs or projections 90 (as seen in FIGS. 9, 10, 11 and 12a). The ribs 90 have a height in the range of about 1/32 to about 1/16 of an inch and the ribs are configured to grippingly engage the end 58 of the connecting rod 16. More preferably, the ribs 66 and the end 58 of the connecting rod 16 have an interference or press fit to hold the components securely, but releasably, in the desired position.

The second end 88 of the connector 90 has a length and shape which is configured to be inserted through an aligned pair of openings 30, 32 and 39 as discussed above. The second end 88 preferably has a length of about 3/4 of an inch and an outside diameter of about 1/4 of an inch—which is smaller than the outside diameter of the first end 84 of the connector 80 to create an abutment surface 92. The abutment surface 92 advantageously prevents the entire connector 80 from being inserted through the openings 30, 32 or 39 in the elongated members 26, 28 and/or cross member 38.

The second end 88 of the connector 22 includes an opening 94 (shown in FIG. 12c) configured to receive a locking device such as a fastener 96 with a head 98 and an elongated shaft 100 (best shown in FIGS. 13a–13c). The opening 94 has a diameter of about 1/8 of an inch and it extends approximately the entire length of the second end 88 of the body 82. The head 98 of the fastener 96 has an outside diameter of about 1/2 of an inch and the shaft 100 is about 1/8 of an inch in diameter and about 3/8 of an inch in length but the fastener 96 can have any desired dimensions. The head 98 is preferably sized larger than the openings 30, 32 or 39 in the elongated members 26, 28 or cross bar 38 to prevent the fastener 96 from passing through the openings. The shaft 100 is configured to be press fit into the opening 94 in the second end 88 of the connector 80, but the elongated shaft of the fastener 96 could be configured to fit over the second end of the connector. The fastener 96 allows the connector 80 to be fastened to the pair of elongated members 26, 28 or an elongated member and cross bar 38 combination.

Figure 11:
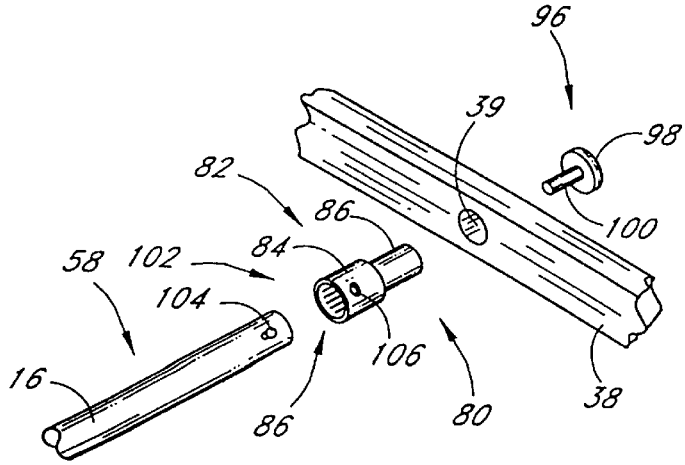
FIG. 11 is a explode, enlarged perspective view of a portion of the connector shown in FIG. 9 illustrating a connector configured to extend through the cross bar.

Referring to FIGS. 9 and 11, the second end 88 is inserted through one of the openings 30, 32 or 39 in members 26, 28, or 38. The abutment surface 92 abuts the members 26, 28 or 38 to limit motion of the connector 80. The shaft 100 of fastener 96 is inserted into the opening 94 and pressed until it locks, preferably with fastener head 98 abutting one side of member 26, 28 or 38, and with abutment surface 92 abutting the opposing side of the member 26, 28 or 38 through which the second end 88 extends. The press fit locks the connector 80 to the member 26, 28 or 38. The end 58 of a rod 16 is then inserted into the opening 86 of connector 80. A plurality of such connections results in the laundry rack 10. As shown in FIG. 11, the connector 80 may also be configured to extend through only a single elongated member 26, 28 or cross bar 38, 47.

The connector 80 preferably includes a fastener 102 configured to lock the connecting rod 16 to the connector. The fastener 102 includes a projection or protuberance 104 which extends outwardly from the end 58 of the connecting rod 16 and the connector 80 includes an opening or detent 106 configured to receive the protuberance. The positioning of the protuberance 104 in the opening 106 securely connects the rod 16 to the connector 80, but it will be appreciated that the rod and connector may be attached in various means. For example, the rod 16 and connector 80 may be attached be a press or interference fit by inserting the end 58 of the rod into the opening 86 in the connector. The distal end 58 of the rod 16 contain a tapered section to facilitate attachment of the rod to the connector 80, but the rod does not have to be tapered. It will be appreciated that the rod 16 may be attached to the connector 22 by other means, such as bolts, screws, adhesives, etc.

In preferred embodiment of constructing the laundry stand shown in FIG. 9, a pair of elongated members 26 and 28 are positioned with the central openings 30 generally aligned. The body portion 82 of the connector 80 is inserted through the aligned openings 30 and a fastener 96 is inserted into the opening 94 in the end of the connector to pivotably connect the elongated members 26 and 28 into a scissor linkage 24. Similar to that described above, additional scissor linkages 24 may be constructed in a similar manner and the scissor linkages may be interconnected by additional connectors 80 to form the first leg 12 and second leg 14. The legs 12 and 14 are preferably constructed with the first ends 84 of the connectors 80 pointed in the same direction, and the legs 12 and 14 are positioned with the connectors generally aligned. The cross bars 38 are then attached to the upper portion 18 of the legs 12 and 14 to secure the legs in an open position, and one or more connecting rods 16 are attached to the connectors 80 to connect the first and second legs to form the laundry stand 10.

In another preferred embodiment of the connector 22, as shown in FIGS. 14–17, the connector 110 may include a body 112 with a generally cylindrical configuration. Longitudinally extending from one end of the body 112 is a pair of legs 114 and 116 which are separated by a gap 118. The outer surfaces of the legs 114 and 116 are preferably cylindrical and generally aligned with the outer surface of the body 112. Radially outwardly extending from each of the legs 114 and 116 are projections 120 and 122, respectively, which are sized and configured to be inserted into holes or recesses 124 and 126 in the end 58 of the rod 16.

Longitudinally extending from the other end of the body 112 is a shaft 128 with a disk 130 mounted to the end of the shaft. The shaft 128 and disk 130 are advantageously configured to fit into the U-shaped cut-out section 44 and the end of cross bar 38 so that the cross bar can be attached the leg 12 or 14. It will be understood that the cross bar 38 may be attached to the connector 110 in any known manner, including those previously described. The connector 110 of course does not require the shaft 128 or disk 130.

The connector 110 shown in FIGS. 14–17 are preferably constructed from a resilient material such as PVC, polyethylene or polypropylene, but any material, whether or not plastic, with suitable characteristics may be used to construct the connector. In particular, the legs 114 and 116 are preferably resilient so that they can be inserted into the end 58 of a connecting rod 16. The gap 118 between the legs 114 and 116 is at least large enough to allow the legs to sufficiently deflect to allow the legs to be inserted into the rod 16. The connector 110 and rod 16 are then positioned to insert the projections 120 and 122 with the recesses 124 and 126 respectively. Because the connector 110 is constructed of a resilient material, the projections 120 and 122 snap into the recesses 124 and 126 to securely connect the rod 16 to the connector. In order to detach the connector 110 from the rod 16, the projections 120 and 122 must be displaced from the recesses 122 and 124 and the connector removed from the rod. Advantageously, the connector 110 creates a very secure connection of the rod and the connector. Alternatively, in another preferred embodiment not shown in the accompanying figures, the end 58 of the rod 16 may be inserted into an opening between legs 114 and 116 and the projections 120 and 122 may be inwardly extending to resiliently engage the recesses 124 and 126 in the rod.

As shown in FIGS. 18–21, another preferred embodiment of the connector 22 includes a body 112 with a generally circular configuration. One end of the connector 22 includes a pair of legs 114 and 116 which are separated by a gap 118. Projections 120 and 122 are positioned near the ends of the legs 114 and 116, respectively, and the projections are sized and configured to be inserted into holes or recesses 124 and 126 in the end 58 of the rod 16. It will be understood that the connector 22 may include any number of projections and these projections may be inserted into any desired hole or recess. For example, the connector 22 may include one or more projections which may be inserted into a single hole or the connector may include a single projection which may be inserted into a plurality of holes.

The other end of the connector 22 includes an outwardly extending flange 140. The flange 140 is preferably generally circular and sized to prevent the connector from passing through elongated members 26 and 28 or cross bar 38. The connector 22 may also include an enlarged portion 142 which may be placed in any desired position along the length of the body 112 of the connector. The enlarged portion 142 is preferably generally circular with an outer diameter generally equal to the inside diameter of the opening 30 in the elongated members 26 and 28 or opening 39 in the cross bar so that the connector is press-fit into the opening. This enlarged portion 142 helps prevent the unintended removal of the connector 22 from the elongated members 26 and 28 or cross bar 38.

Figure 22:
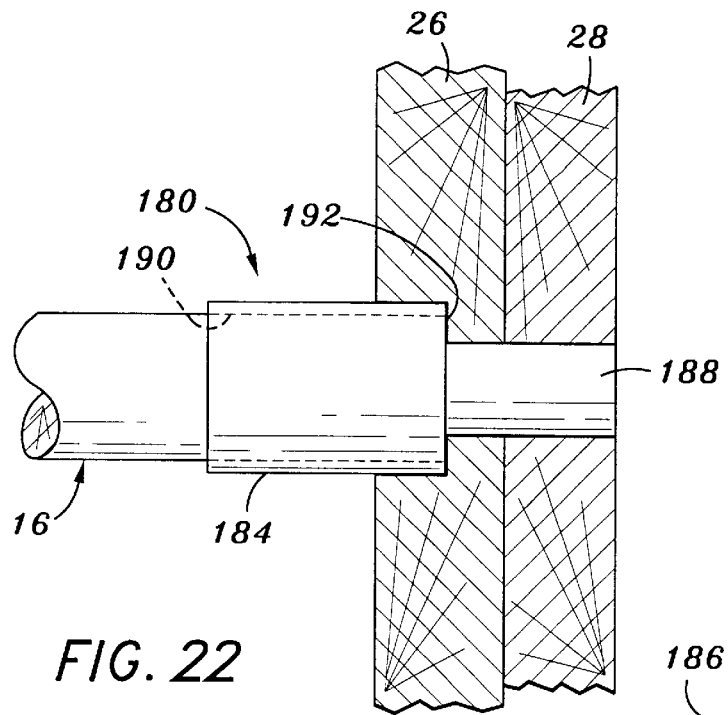
FIG. 22 is a partial sectional view of an alternative embodiment of a connector assembly of this invention.
Figure 24:
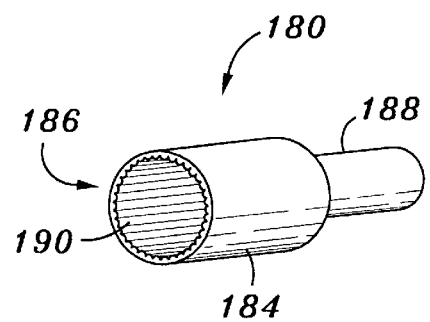
FIG. 24 is a perspective view of the connector assembly of FIG. 22.
Figure 23:
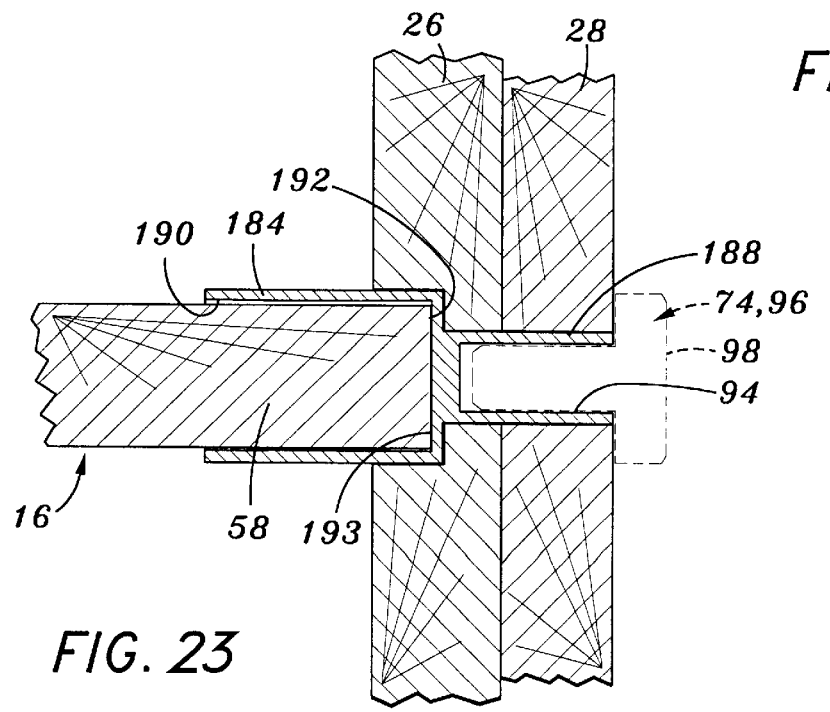
FIG. 23 is a sectional view of the connector assembly of FIG. 22.

A further embodiment is shown in FIGS. 22–24. The connector 180 corresponds to connector 80 described relative to FIGS. 9 and 12, but without the locking projection 102. The connector 180 includes a body portion that preferably has a generally cylindrical, exterior configuration, but could have other exterior shapes. The connector 180 includes a first end 184 with an opening 186 configured to receive the end 58 of connecting rod 16. The connector 180 also has a second end 188 configured to be inserted through aligned central openings 30 formed in the pair of adjacent elongated members 26, 28 (see also FIG. 9); or aligned openings 32 near the ends of a pair of elongated members (as shown in FIG. 1). The second end 188 may also be configured to extend through an opening 32 at an end of an elongated member 16 and an opening 39 in the cross bar 38 (as seen in the upper portion of FIG. 1).

The first end 184 of the connector 180 preferably has a length of about ⅝ of an inch, an outside diameter of about ½ of an inch, and an inside diameter of about ⅜ of an inch. It is advantageously large enough to have an opening 186 sized to receive the end 58 of the rod 16 and retain that end during use without breaking. Located on the inner surface of the opening 186 in the first end 184 of the connector are a plurality of inwardly extending ribs or projections 190 (also as seen in FIGS. 9, 10, 11 and 12a as part 90). The ribs 190 have a height in the range of about 1/32 to about 1/16 of an inch and the ribs are configured to grippingly engage the end 58 of the connecting rod 16. They may be of various shape.

More preferably, the ribs 190 and the end 58 of the connecting rod 16 have an interference or press fit to hold the components securely, but releasably, in the desired position during use.

The second end 188 of the connector 180 has a length and shape which is configured to be inserted through an aligned pair of openings 30, 32 and 39 as discussed above. The second end 188 preferably has a length of about ¾ of an inch and an outside diameter of about ¼ of an inch, which is smaller than the outside diameter of the first end 184 of the connector 180 to create an abutment surface 192. The abutment surface 192 advantageously prevents the entire connector 180 from being inserted through the openings 30, 32 or 39 in the elongated members 26, 28 and/or cross member 38.

Preferably, the openings 30, 32 or 39 are stepped recesses having a larger diameter on the surface adjacent the rod 16, but ending at a bottom surface 193 internal to the parts 26 (or 28, 38 etc.) in which the recess or opening is formed. A smaller hole extends. through the part to form an internal bottom 193 of the recess against which the abutment surface 192 rests when inserted in to the openings. The second end 188 of the connector 180 extends through the members 26, 28 (or cross bar 38). Preferably the first end 184 forms a press fit with the recess in member 26, or is otherwise fastened to form a secure connection between the first end 184 and the adjacent member 26 in which the first end is received. Gluing, nailing, staking or other fastening means could also be used to connect these two parts.

The second end 188 of the connector 22 includes an opening 94 (shown in FIG. 12c) configured to receive a locking device such as a fastener 96 with a head 98 and an elongated shaft 100 (best shown in FIGS. 13a–13c). The opening 94 has a diameter of about ⅛ of an inch and it extends approximately the entire length of the second end 88 of the body 82. The head 98 of the fastener 96 has an outside diameter of about ½ of an inch and the shaft 100 is about ⅛ of an inch in diameter and about ⅜ of an inch in length but the fastener 96 can have any desired dimensions. The head 98 is preferably sized larger than the openings 30, 32 or 39 in the elongated members 26, 28 or cross bar 38 to prevent the fastener 96 from passing through the openings. The shaft 100 is configured to be press fit into the opening 94 in the second end 88 of the connector 80, but the elongated shaft of the fastener 96 could be configured to fit over the second end of the connector. The fastener 96 allows the connector 80 to be fastened to the pair of elongated members 26, 28 or an elongated member and cross bar 38 combination.

The second end 188 is inserted through one of the openings 30, 32 or 39 in members 26, 28, or 38. Preferably the abutment surface 192 abuts the shoulder 193 in members 26 to limit motion of the connector 180 and prevent it from passing through the member. It is possible, but less preferred, to have the first portion 184 extend completely through the member 26 (or 38) and fastened to that member to prevent relative motion along the length of the rod 16. The second end 188 preferably is secured to the second member 28. A press fit, nailing, gluing, staking or other fastening means can be used to prevent relative motion of the end 188 relative to the member 28. But the fastening of the first end 184 and second end 188 to their adjacent members 26 (or 38), 28 respectively, must be such as to allow one of the members 26, 28 (or 38) to rotate relative to the other member.

The end 58 of a rod 16 is then inserted into the opening 186 of connector 180. A plurality of such connections results in the laundry rack 10. Further, in a manner analogous to that shown in FIG. 11, the connector 180 may also be configured to extend through only a single elongated member 26, 28 or cross bar 38, 47.

In use, the connector 180 has a first end 184 fastened to one leg 26 of the collapsible end of the laundry rack 10. The second end 188 is fastened to the other leg 28 of the collapsible end of the laundry rack. 10. A rod 16 is inserted into the connector 180 and preferably fastened to the connector by gluing, nailing etc., although it is possible that a press fit or even a loose connection could be used between the first end 184 and rod 16. As the laundry rack 10 is folded and unfolded, the members 26, 28 rotate relative to each other on at least one of the ends 184, 188 of connector 180—which act as a pivot. This allows a collapsible rack, while the allowing the rack to be shipped unassembled to reduce shipping space and costs. The rack is easily assembled for use.

In this alternative embodiment, the rods 16 are preferably made of wood, as are the members 26, 28, 38, 46, but they could be made from other materials. The connector 180 is preferably made of plastic, and forms an interference fit with the members that engage the respective ends 184, 188 of the connector 180.

Basically, the connector 180 has a female socket formed in first end 184 into which the end 58 of rod 14 is inserted. The female socket is inserted into a recess of the member 26 and held there. A second, male end 189 of the connector extends through the adjacent member 28 and is held there. The members 26, 28 pivot about the connector 180 as the ends of the laundry stand 10 collapse and expand. It is possible to have one end 184, 188 fixed to its respective member 26, 28 so there is no relative rotation between those parts, but if both ends 184, 188 are fixed to their respective members 26, 28, then the laundry stand 10 cannot collapse as rotation about connector 180 is restrained. Thus, the ends 184, 188 must be held in members 26, 28, but must allow rotation to collapse the laundry stand. Similar connections are made with the cross pieces 38.

In a further embodiment best seen in FIG. 23, the connector 180 can have a second end 188 like the ends 56 or 88 shown and described in FIGS. 4–11, in which a recess 94 in the second end 188 receives a fastener to hold the member 28 onto the second end 188. In those figures shaft 100 of fastener 74 or 96 is inserted into the opening 94

Formed in what would be end 188, and pressed until it locks, preferably with fastener head 98 abutting one side of member 28 or 38, and with abutment surface 192 abutting the recessed surface 193 to lock the members together. The press fit and fasteners 74, 96 lock the connector 180 to the member 26, 28 or 38.

Figure 24B:
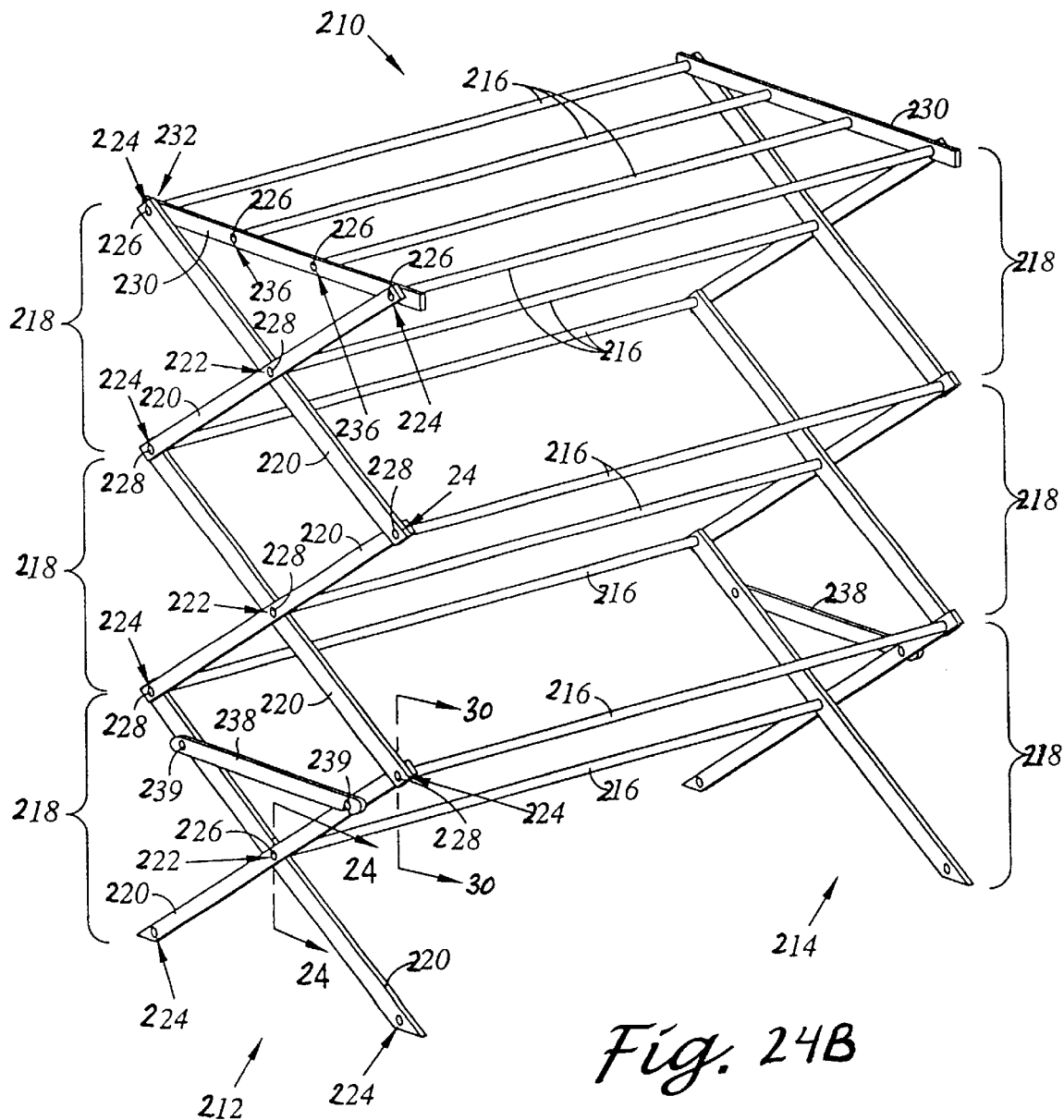
FIG. 24B is a perspective view of a laundry drying rack of the present invention.

A further embodiment of an improved drying rack is shown in FIGS. 24B–31. Referring now to FIG. 24B, a collapsible laundry drying rack 210 is shown. The laundry drying rack may be provided with two opposing collapsible legs 212, 214 which are joined by a plurality of connecting rods 216. Laundry is hung on the connecting rods 216 to dry the laundry during use of the laundry drying rack 210.

Referring now additionally to FIG. 25, the collapsible legs 212, 214 may be formed by a series of scissor linkages 218. The scissor linkages 218 allow the legs 212, 214 to collapse for ease of shipment and storage, and to expand for subsequent usage of the laundry drying rack 210.

Each of the scissor linkages 218 include a pair of crossed elongate leg members 220. The elongate leg members 220 preferably include central openings 222 and distal openings 224 laterally disposed therethrough. As discussed in detail below, selective usage of end connector sets 226 (FIGS. 26–28) and cylindrical connector sets 228 (FIGS. 29–31) in conjunction with the openings 222, 224 are used to rotatably connect the leg members 220 to each other as well as to the connecting rods 216. In this regard, the end connector sets 226 and cylindrically connector sets 228 allow joining of a pair of the elongate leg members 220 at their respective central openings 222 to form a given scissor linkage 218. Further, the end connector sets 226 and cylindrically connector sets 228 further allow interconnection of adjacent scissor linkages 218 by joining the distal openings of the leg members 220 of such adjacent scissor linkages 218. As is depicted, three such scissor linkages 218 are used to form each leg 212, 214, but the number can vary. Usually, two to four such scissor linkages 218 are joined, depending upon the desired size of the laundry drying rack 210.

At the top of the laundry drying rack 210, on each leg 212, 214 is a cross bar 230 which connects the ends of the leg members 220 of the top-most scissor linkage 218. The cross bars 230 also stabilize the legs 212, 214 and lock them into position because the fixed connection of the central and distal openings 222, 224 form a triangular arrangement of fixed dimension. Each cross bar 230 may further include a distal opening 232 laterally formed in a distal end thereof and a notch 234 formed in an opposing distal end thereof. The notch 234 (FIG. 25) is used to releasably engage the cross bar 230 from the distal end of the adjacent leg member 220. As such, the cross bar 230 may be disengaged and rotated to allow the legs 212, 214 to be collapsed, as depicted in FIG. 25. Other ways to releasably connect a stabilizing bar 230 can be used. Further, additional, or fewer, openings, 236 may be formed in the cross bar 230 between the distal opening 232 and the notch 234 for attachment of the connecting rods 216 across the top of the laundry drying rack 210.

On one of the scissor linkages 218, typically on the bottom-most scissor linkage 218, a locking bar 238 is provided. The locking bar 238 connects to opposing leg members 220 of the scissor linkages 218 in order to hold them in a fixed relative position and thereby further stabilized the laundry drying rack 210 in the expanded position. The locking bar 238 is preferably provided on each of the legs 212,214 as shown, but could be on only one of the legs 212, 214. The locking bar 238 can comprise an elongated member that has ends configured to engaged the abutting leg members 220. The engagement can be by through the use of pins 239, as shown, in order to fix the locking bar 238 to the adjacent leg members 220. Other engagement arrangements may be used, such as a mating projection and slot arrangement, in which one of the leg members 220 or the locking bar 238 has a slot and the other has a protrusion that engages the slot to restrict relative motion of the engaged parts. Alternatively, one end of the locking bar 38 can be rotatably connected to one of the leg members 20 and the other end of the locking bar 238 can releasably engage the other leg member 220.

The connecting rods 216 preferably comprise wooden dowels 240 coated with a thin plastic coating 242. A polyvinylchloride (PVC), polyethylene or polypropylene or other plastic coating could be used. The plastic coating 242 is preferably thin relative to the diameter of the dowel 240. A thickness of a few thousandths of an inch is believed suitable. The wooden dowels 240 could be dipped in plastic to form the plastic coating 242. The plastic coating 242 provides a relatively smooth, snag-free exterior, while the wooden dowel 240 provides strength for the connecting rod 216. The coating is provides the connecting rods 216 with water-proof and insulative qualities so as to mitigate the adverse effects of moisture from laundry placed on the connecting rods 216. Latex or oil based paints could be used, but are preferably not used for the plastic coating 242 as they lack sufficient water-proof or durability characteristics.

As mentioned above, various components of the connector sets 226, 228 (FIGS. 26–28) are selectively used to the leg members 220 to each other as well as to the connecting rods 216. The end connectors 226 and cylindrical connectors 228 and associated components are advantageously integrally molded of polyvinylchloride (PVC), polyethylene, polypropylene, nylon, Teflon® or other plastic materials so that each component forms a single piece upon completion of molding of that piece.

Preferably, end connector sets 226 are disposed through the distal openings 224 of the leg members 220 of the top-most scissor linkages 218 and the associated adjacent cross bar 230. Further, the end connector sets 26 are preferably used to attach the two cross bars 230 to each other with interposed connecting rods 216. The end connector sets 226 also preferably interconnect the leg members 220 about their respective central openings 222 to form the bottom-most scissor linkage 218. As discussed further below, the cylindrical connector sets 226 are used to rotatably connect leg members 220 at the various other unconnected central and distal openings 222, 224.

As discussed below, the end connector sets 226 have a relatively high resistance to being axially disengaged in comparison the to the cylindrical connector sets 228 FIGS. 29–31). In this regard, usage of the end connector sets 226 at all of the central and distal openings 222, 224 of the leg members 220 is desirable and is contemplated to result in a comparably stable structure of the laundry drying rack 210. However, it is further contemplated that the end connector sets 226 are more structurally complex, and therefore more expensive to manufacture in comparison to the cylindrical connector sets 228. As such, the selective usage of the end connector sets 226, as described above, is a preferred balance between component utility and cost. While not a desirable, it is believed possible to use only end connector sets 226, or only end connector sets 228, for the entire laundry stand.

Figure 28:
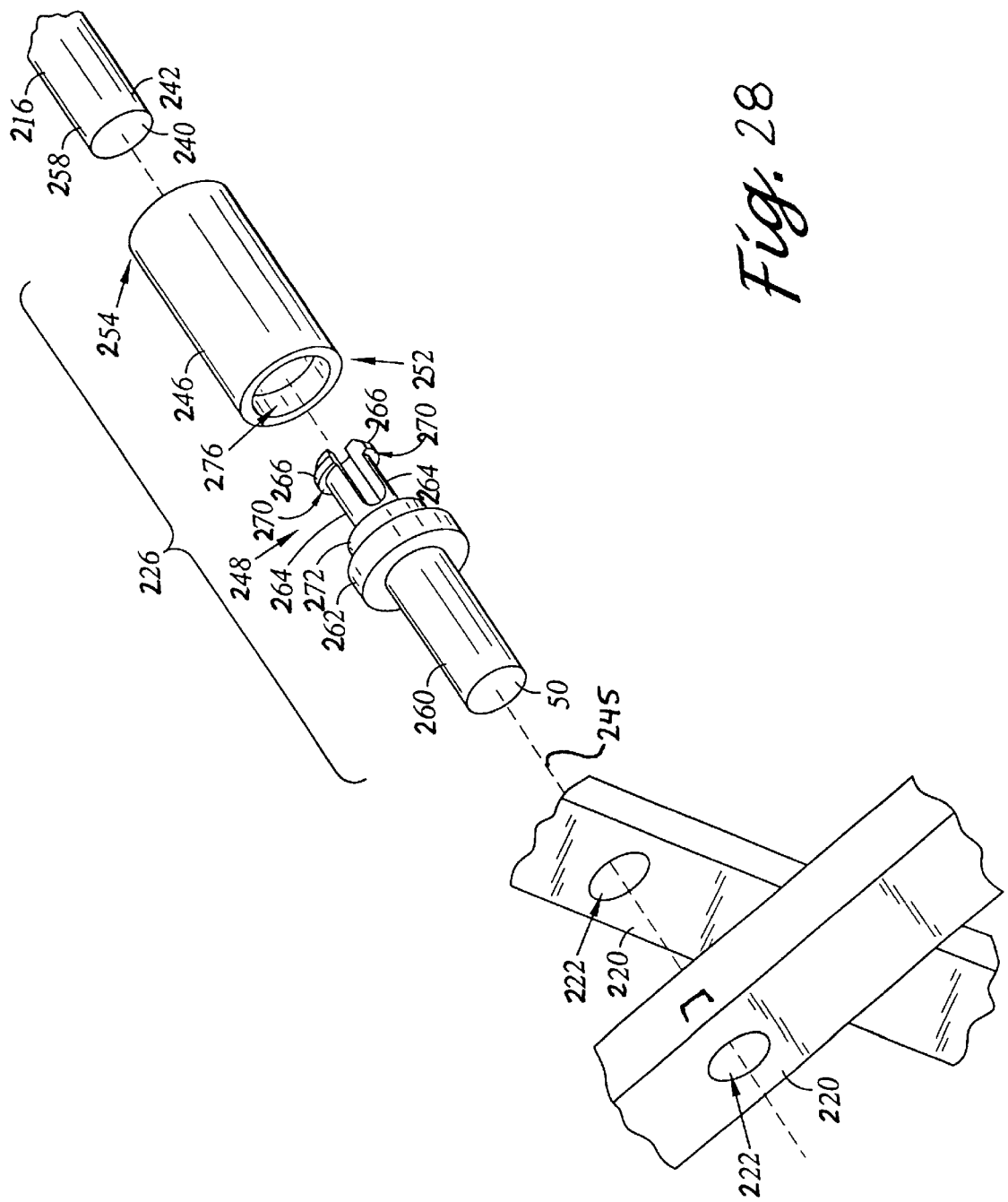
FIG. 28 is a perspective exploded view of the end connector set, connecting rod and leg members of FIG. 24B.

Referring now to FIGS. 26–28, an end connector set 226 is depicted. In particular, FIG. 26 depicts a side view of a disengaged end connector set 226 of an aspect of the present invention. FIG. 27 is a cross-sectional side view of the end connector set 226 as shown engaged with a connecting rod 216 (partially depicted) and leg members 220 (partially depicted) of the laundry drying rack 210 of FIG. 24B as seen along axis 27—27. FIG. 28 is a perspective exploded view of the end connector set 226, connecting rod 216 and leg members 220 of FIG. 27 as they extend along longitudinal axis 245.

Each end connector set 226 includes an end connector 244 and a tubular coupling 246. The end connector 244 has an end 248 with resilient prongs and a post end 250. The post end 250 may be sized and configured to extend within the central opening 222 (as well as distal opening 224 and the openings 232, 236 of the cross-bar 230, though not shown) of the elongate leg member 220 for connecting the elongate leg member 220 to the end connector 244.

The post end 250 is preferably nailed, staked, glued or otherwise fastened to one of the members 220, but not fastened to both in order to allow joined members 220 to rotate about the common post 250. The tubular coupling 246 has a coupling distal end 252, an opposing coupling proximal end 254, and an engaging surface 256 that advantageously takes the form of an internal ridge, or recess. The engaging surface 256 is illustrated as an interval ridge 256 and will be referred to as such in the remaining description. The ridge preferably extends around the entire interior circumference of the coupling 246. The coupling proximal end 254 is sized and configured to axially receive a connecting rod distal end 258 of the connecting rod 216 therein. The coupling distal end 252 is sized and configured to axially receive the pronged end 248 of the end connector 244 therein. The engaging surface 256 is sized and configured to engage the pronged end 248 of the end connector 244 and preferably, but optionally to allow rotatable engagement of the tubular coupling 246.

In the preferred embodiment of the present invention, the post end 250 has a post 260. The post 260 is sized and configured to extend within the openings 222 of the elongate leg members 220 for connecting the elongate leg members 220 to the end connector 226. The post 260 may be sized and configured for press-fit engagement with the openings 222 of the elongate leg member 220. The end connector 244 may have a radially extending flange 262 disposed between the pronged end 248 and the post end 250. The flange 262 is sized and configured to abut the adjacent-most leg member 220 adjacent the opening 222 thereof when the post end 250 is extended therewithin, as shown in FIG. 27. The flange 262 is preferably, but optionally further sized and configured to abut the coupling distal end 252 of the tubular coupling 246 when the pronged end 248 is axially received therewithin, as further shown in FIG. 27.

The pronged end 248 preferably includes a pair of resilient prongs 264. The resilient prongs 264 may comprise opposing sides of a cylindrical member having a lengthwise slot 268 defining the resilient prongs 264 in spaced relation thereto. The resilient prongs 264 each terminate with a prong head 266 thereof. The prong heads 266 each have an engagement surface 270 for engaging the tubular coupling 246 adjacent the engaging surface 256 formed of internal ridge, or recess 256 when the pronged end 248, and more particularly the resilient prongs 264, are axially received within the coupling distal end 252.

The coupling distal end 252 of the tubular coupling 246 has a distal end inner surface 276 that preferably, but optionally tapers towards and terminates adjacent to the internal ridge 256. The surface 276 could be cylindrical, forming a ledge 256 to engage prongs 264, or forming a recess to engage prongs 256. In this regard, during insertion of the prongs 264 into the coupling distal end 252, the prongs 264 are sized and configured to expand radially outward as the prongs slid along the distal end inner surface 276 towards the internal ridge 256. Thus, the resiliency of the prongs 264 allow them to resiliently engage the tubular coupling 246 adjacent the internal ridge 256 when axially received within the coupling distal end 252.

The resilient prongs 264 are further sized and configured to contract radially inward in slidable engagement with the distal end inner surface 276 during axial insertion into the coupling distal end 252. The coupling distal end 252 of the tubular coupling 246 has a distal end inner surface 276 tapering towards and terminating at the internal ridge 256. The pronged end 248 of the end connector 244 is sized and configured to contract radially inward in slidable engagement with the distal end inner surface 276 during insertion thereof into the coupling distal end 252. As such, once the prongs 264 have cleared the internal ridge 256 the resiliency of the prongs 264 allow the prongs 264 to contract radially inward within the lengthwise slot 268 during axial insertion into the coupling distal end 252 beyond the internal ridge 256. Such contraction allows the engagement surfaces 270 of the prong heads 266 to securely engage the tubular coupling 246 adjacent the internal ridge 256 thereby locking the end connector 244 to the tubular coupling 246.

The end connector 244 also preferably, but optionally, has a plug 272. The plug 272 is sized and configured to extend within the coupling distal end 252 when the pronged end 248 is axially received within the coupling distal end 252. In this regard, the resilient prongs 264 extend from the plug 272. The plug 272 is preferably sized and configured to engage the coupling distal end 252 in press-fit engagement therewith.

The coupling proximal end 254 is sized and configured to receive the connecting rod distal end 258. The coupling proximal end 252 preferably, but optionally, has a proximal end inner surface 274 tapering inward towards the coupling distal end 252, for axially receiving the connecting rod distal end 258 in press-fit engagement.

If the distal end of the rod 216 were too close to the engaging surface 256, then the rod 216 could prevent engagement of the prongs 264 with the engaging surface 256. Advantageously, an impediment to passage of the rod 216 is provided in order to limit the insertion of the rod into the coupling 246. An internal ledge 275 (FIG. 26) extending around the inner circumference of the coupling, can be easily formed in the coupling 246 as it is molded in order to limit the insertion depth of the rod 216. In order to further, positively secure attachment of the connecting rod distal end 258 to the tubular coupling 246, a nail, staple, adhesive or other mechanism may further be used. A staple is shown in FIG. 27.

The end connector 244 and coupling 246 allow the use of solid rods 216, and allow easy connection to the legs forming the laundry drying rack. It is believed advantageous to fasten the distal end of post 260 to the leg member 220 through which that distal end is inserted. That prevents the post 260 from being pulled out of the member 220 along the longitudinal axis 245. As shown in FIG. 5, this can be achieved by a nail or staple being driven through the leg member 220 into the post 260, or it could be a screw or glue or other fastening mechanism.

The tapered end of the prongs 264, and/or the tapered walls 276 of the coupling 246 forming the recess into which the prongs 264 are inserted, make it easy to connect the rods 216 to the leg members 220. The connector 244 can be fastened to the leg members 220 at the factory, and the coupling 246 can be fastened to the rods 216 at the factory. Both are preferably fastened using nails, brads, staples or such in order to provide for a fast but inexpensive and sturdy connection. The coupling 246 and connector 244 still allow a compact assembly of parts for shipment. The couplings 246 only add a couple of inches to the length of the rods 216. While the connectors 244 extend perpendicular to the collapsed legs formed by scissor linkages 218, the connectors are short and do not take up much room.

Upon receipt, the prongs 264 need only be inserted into couplings 246 in order to fasten the rods 216 to the legs of the laundry rack and thereby prevent separation of the laundry rack along longitudinal axis 245 that runs along the length of each rod 216. The parts snap together, with the tapered surfaces making the insertion and assembly easy to achieve.

Figure 29:
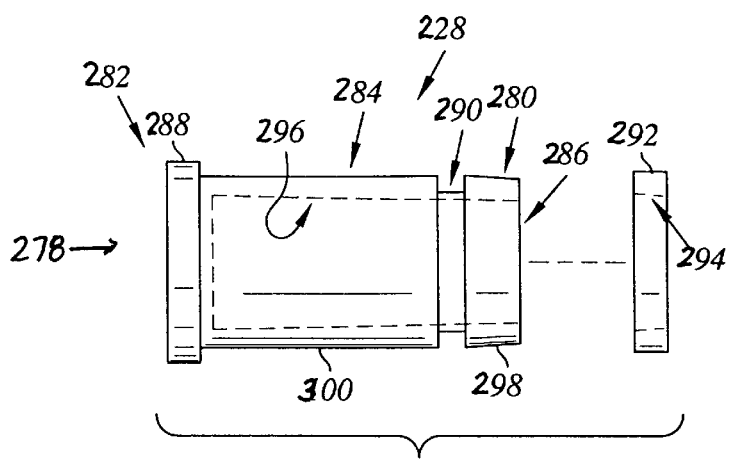
FIG. 29 is a side view of a disengaged cylindrical connector set of an aspect of the present invention.
Figure 30:
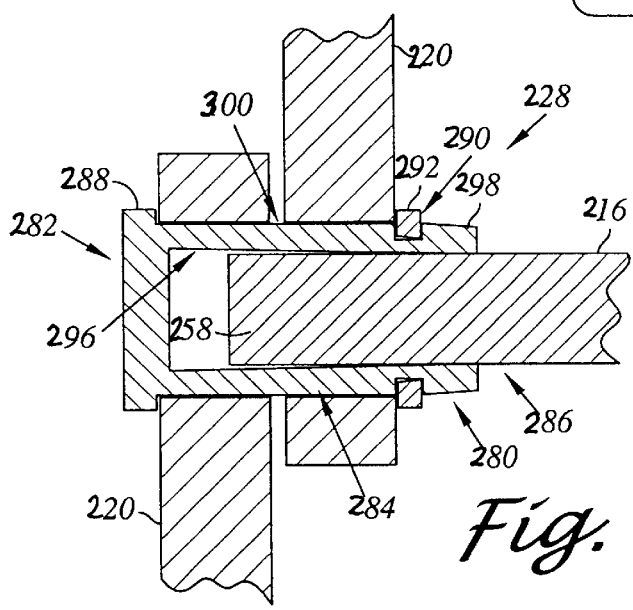
FIG. 30 is a cross-sectional side view of a cylindrical connector as shown engaged with a connecting rod (partially depicted) and leg members (partially depicted of the laundry drying rack of FIG. 24B as seen along axis 30—30.
Figure 31:
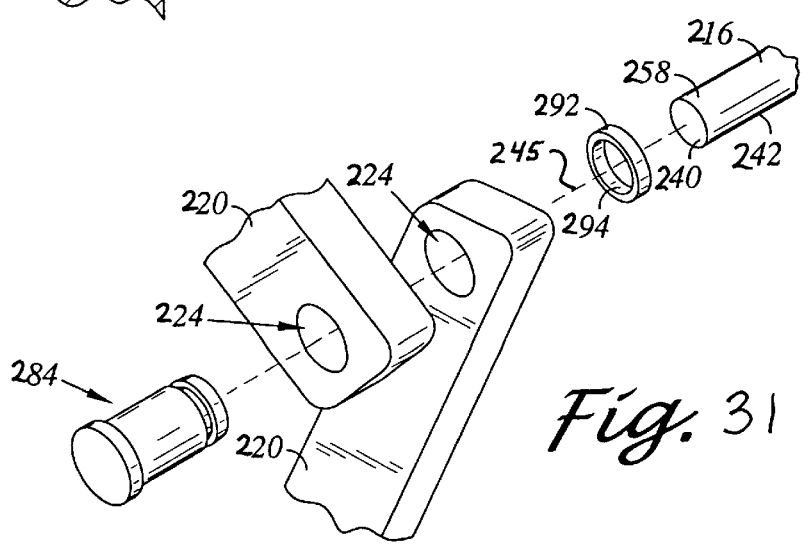
FIG. 31 is a perspective exploded view of the cylindrical connector set, connecting rod and leg members of FIG. 30.

Referring now to FIGS. 29–31, a cylindrical connector set 228 is depicted. In particular, FIG. 29 depicts a side view of a disengaged cylindrical connector set 228 of an aspect of the present invention. FIG. 30 is a cross-sectional side view of a cylindrical connector set 228 as shown engaged with a connecting rod 216 (partially depicted) and leg members 220 (partially depicted) of the laundry drying rack 210 of FIG. 24B as seen along axis 30-30. FIG. 31 is a perspective exploded view of the cylindrical connector set 228, connecting rod 216 and leg members 220 of FIG. 30 along longitudinal axis 245.

Each cylindrical connector set 228 is provided with a cylindrical connector 278 held to the leg member 220 through which the connector 278 is inserted by a retaining member 292. The retaining member 292 can comprise any of a variety of fasteners that hold the connector 278 to the leg member 220 and prevent removal from the opening in that leg member through which the connector 278 is inserted. Nails, screws and other such fasteners can be used. Preferably, a snap ring, lock ring, or other member that engages a mating recess 286 to prevent movement of the part containing the recess along longitudinal axis 245 (FIG. 8) is used because they allow easy assembly by the user.

Advantageously the retaining member 292 comprises a retaining ring 292. The cylindrical connector 278 has an open end 280, an opposing flanged end 282, and a post section 284 disposed therebetween. The open end 280 has a recess 286 formed therein extending axially toward the flanged end 282. The recess 286 is sized and configured to axially receive the connecting rod distal end 258 therein for engagement of the cylindrical connector 278 to the connecting rod 216. The flanged end 282 has a flange 288 extending radially therefrom.

The post section 284 is sized and configured to extend through the distal openings 224 (as well as the cental openings 222, though not shown) of the elongate leg members 220 with the flange 288 abutting the elongate leg member 220 adjacent the distal opening 224 of the adjacentmost leg member 220. The post section 284 has an external groove 284 circumferentially formed therein. In this regard, the post section 284 has an outer surface 300 which slidably interfaces with the leg members 220 at the distal openings 222 thereof. The retaining ring 292 is sized and configured to receive the open end 280 of the cylindrical connector 278 therethrough. The retaining ring 292 is further sized and configured to concentrically engage the external groove 284, for capturing the elongate leg member 220 between the flange 288 and the retaining ring 292 about the post section 284.

In the preferred embodiment, the cylindrical connector 278 is sized and configured to engage the connecting rod distal end 258 in press-fit engagement therewith. As such, the recess 286 may be tapered outward toward the open end 280 for axially receiving the connecting rod distal end 258 in press-fit engagement. The end 58 of the rod 216 may also be tapered. The cylindrical connector 228 has an outer surface 298 tapering from the external groove 290 towards the open end 280 for receiving the retaining ring 292 thereover. The elastic retaining ring 292 is sized and configured to radially expand in slidable engagement over the outer surface 298 of the cylindrical connector towards the external groove 290.

The elastic retaining ring 292 has a ring inner surface 294 tapering towards the open end 280 of the cylindrical connector 278 when the elastic retaining ring 292 is engaged with the external groove 290. Having slid the retaining ring 292 over the outer surface 298 of cylindrical connector 278, the retaining ring 292 radially expands as the mating tapered surfaces 294, 298 slide over each other, and then the ring snugly engages the external groove 290. Such engagement is contemplated to radially constrict the open end 280 of the cylindrical connector 278 about the connecting rod distal end 258. Further, it is contemplated that the sizing of the retaining ring 292 is configured to resist removal from such engagement with the external groove 90 thereby securing the leg members 220 between the retaining ring 292 and the flange 288. Such removal is further resisted with the particular tapering of the inner surface 294.

In addition, it is contemplated that the above described components comprising the various embodiments of the laundry drying rack 210 may be provided unassembled or partially assembled to an end user. Such unassembled or partially assembled components may therefore comprise a kit for constructing the laundry drying rack 210. It is contemplated that such disassembled state allows for easy shipping and packaging and avoidance of assembly/manufacturing costs.

In order to aid an end user with the assembly of such kit constructing the laundry drying rack 210, the various components thereof may be particularly sized and even color coded in order to ensure proper assembly thereof. In this regard, the end connector set 226, the cylindrically connector sets 228, and opening 222,224 etc. may be sized differently so as to only fit within selected ones of the distal and central openings 224, 222 of the leg members 220, as well as the distal openings 232, notch 234 and additional openings 236 of the cross bar 230.

In this regard, the post end 250 of the end connector 244 and the post section 284 of the cylindrical connector 278 may be sized differently so as to correspond to respective selective ones of the distal and central openings 224, 222 of the leg members 220, as well as the distal openings 232, notch 234 and additional openings 236 of the cross bar 230.

The above parts can be provided in the form of a kit for compact shipping, and assembled by the user or by a retailer. Each kit advantageously includes two collapsible legs each having at least a pair of elongate leg members joined to rotate about a common axis to collapse and expand the legs. The kit also includes a plurality of connecting rods having opposing distal ends and sized so the opposing ends can connect to a different one of the collapsible legs.

Further, the kit includes a plurality of connectors each having an open end, an opposing flanged end, and a post section disposed therebetween. The open end has a recess formed therein extending axially toward the flanged end, and a distal end configured to receive a connecting rod in the recess when the laundry rack is assembled. The flanged end has a flange that prevents passage of the connector through an opening in a leg member through which the connector is inserted during use. The post end having an external groove circumferentially formed therein, the post section being sized to place the groove on a side of the leg member through which the connector is inserted that is opposite the flanged end of the connector. One of the cylindrical connectors and connecting members is inserted through openings in the leg members to join the leg members so they rotate about the common axis to collapse and expand the legs, each leg having correspondingly located cylindrical connectors.

The kit also includes a plurality of retaining members, preferably taking the form of elastic retaining rings sized and configured to receive the open end of the cylindrical connector therethrough and engage the groove to capture the elongate leg member through which the connector is inserted between the flange and the ring when the laundry rack is assembled. Moreover, the kit includes at least one pronged connector fastened to each leg. Each pronged connector has an end with resilient prongs and a post end. The post end is sized and configured to extend through an opening of an elongated member on each leg to fasten the connector to each leg. Each leg has correspondingly located pronged connectors.

Finally, each kit has at least two tubular couplings each having a distal end, an opposing proximal end, and an internal engaging surface therein. The proximal end of the at least two couplings is connected to opposing ends of a connecting rod, with the distal end being sized and configured to axially receive the prongs therein. The internal ridge or engaging surface is configured and located to engage the resilient prongs and restrain removable of the prongs from the coupling.

When the kit comprising the various components of the laundry drying rack is provided, there is also provided a simple and fast method of forming a laundry drying rack. The method comprises inserting distal ends of a connecting rod into the recesses of corresponding connectors on both legs to connect the legs together, and inserting distal ends of the couplings on the at least one connecting rod over the corresponding prongs on opposing legs to engage the prongs with the internal recess of the engaged coupling to restrain the legs from moving away from each other along a longitudinal axis of the rod having the couplings.

Even the assembly of various sub-components at the factor level is simplified with the above invention. The flanged connectors 278 can be inserted into the openings through the end members 220 from only one side in order to assemble the scissor sections 218 forming each of the two opposing legs 212, 214 of the drying rack. The length of the post 300 will vary depending on the dimensions of the members 220 through which the connector 278 is inserted. The size of the openings in the end members 220 can be varied and correlated with the size of the connectors 278 in order to ensure the correct parts are placed through the correct openings. That allows easy and fast assembly of the legs 212, 214. The couplings 246 are easily inserted onto and fastened to the connecting rods 16. The pronged end connectors 244 are easily inserted into appropriate openings 222, 224 and fastened to the appropriate member 220.

The above description is given by way of example, and not limitation. Further, the various features of this invention can be used alone, or in varying combinations with each other and are not intended to be limited to the specific combination described herein. Thus, the connectors can be used by themselves in other applications. The unassembled parts can be provided by themselves in kit form. The parts when assembled together to form a laundry stand, or laundry drying rack forms yet another advantageous combination.

Further, the prongs 264 and pronged end 248 could be formed on or connected to a distal end of the connecting rods 216, and the couplings 246 have an additional internal engaging surface to connect the pronged end 248. Further, the pronged end 248 on the connector 2248 could be replaced with the tubular end 252 having an internal engaging surface such as ridge 256 to engage a pronged end 248 located on a rod 216. Additionally, for the parts benefitting from a press-fit, the press-fit can be achieved by using the raised ridges or the tapered surfaces described in various embodiments of this disclosure.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention. Moreover, the invention is not to be limited by the illustrated embodiments but is to be defined by the following claims when read in the broadest reasonable manner to preserve the validity of the claims.

What is claimed is:

1. A laundry drying rack having a plurality of elongate leg members rotatably joined to form two opposing scissor-legs, with a plurality of connecting rods extending between the legs to form the drying rack, comprising:
   an opening formed laterally in at least one leg member;
   an end connector having a pronged end with resilient prongs and an opposing post end, the post end extending into the opening in the at least one leg member to connect the at least one leg member to the end connector; and
   a tubular coupling having a proximal end engaging a distal end of one of the rods, the coupling having an opposing distal end and an internal engaging surface, the distal end being sized and configured to axially receive the prongs therein, the internal engaging surface being configured and located to engage the prongs to connect the coupling and its engaged rod to the end connector.

2. The laundry drying rack of claim 1 wherein the post end of the end connector has a post that extends through two end of the leg members so the two leg members can rotate relative to each other about the post.

3. The laundry drying rack of claim 2 wherein the proximal end of the coupling forms a press fit with the distal end of the rod inserted into the proximal end.

4. The laundry drying rack of claim 1 wherein the engaging surface comprises a flange extending inward toward a longitudinal axis of the coupling.

5. The laundry drying rack of claim 1 wherein the end connector has a flange extending away from a longitudinal axis of the connector and located between the pronged end and the post end, the flange located to abut the elongate leg member adjacent the opening through which the post of the connector is inserted.

6. The laundry drying rack of claim 1, further comprising a flange from which the pronged end extends, the flange sized and configured to engage an interior of the distal end of the coupling when the prongs engage the engaging surface of the coupling.

7. The laundry drying rack of claim 1 wherein the prongs comprise opposing sides of a cylindrical member having a lengthwise slot defining the resilient prongs in spaced relation to the slot.

8. The laundry drying rack of claim 7, wherein the engaging surface of the coupling comprises a ledge and wherein the prongs each terminate with a prong head engaging the ledge when the pronged end is axially received within the coupling distal end.

9. The laundry drying rack of claim 7 wherein the distal end of the coupling has an interior surface tapering towards the engaging surface.

10. The laundry drying rack of claim 1 further comprising:
    a cylindrical connector having an open end, an opposing flanged end, and a post section disposed therebetween, the cylindrical connector being inserted through the opening of the leg member with the flanged end preventing passage of the cylindrical connector through the leg member, the open end having a recess formed therein extending axially toward the flanged end, the recess receiving a distal end of one of the rods therein, the cylindrical connector having an external groove extending around its circumference and a retaining member sized and configured to engage the groove and prevent passage of the cylindrical connector through the opening of the leg member.

11. The laundry drying rack of claim 10 wherein the cylindrical connector is placed through aligned openings in two leg members with the flange abutting an exterior of one leg member and the retaining member abutting an exterior surface of the other of the two leg members.

12. A laundry drying rack comprising:
    two collapsible legs, each leg having at least one pair of elongate leg members, each leg member having an opening formed laterally therein at a location about which the leg members rotate to collapse the legs;
    a plurality of connecting rods each having distal ends connected to different ones of the legs;
    an end connector having an end with resilient prongs and having an opposing, post end that extends into the opening in each of the leg members;
    a coupling having a distal end and an opposing proximal end engaging one of the distal ends of the connecting rods, the coupling having an internal ridge in communication with a recess into which the resilient prongs are inserted to engage the ridge.

13. The laundry drying rack of claim 12, wherein the end connector with the post end comprises a cross-bar extending between and connecting two leg members together.

14. The laundry drying rack of claim 13, further comprising a cylindrical connector extending through one of the openings in one of the leg members until a flanged end of the connector abuts the leg member with the opening through which the connector is inserted, the connector having an opposing end with a recess around an exterior circumference of the connector and a retaining member positioned in the recess to prevent removal of the connector from the opening through which the connector is inserted, the connector having an open end opposite the flanged end with a recess in the open end into which one of the connecting rods is inserted.

15. The laundry drying rack of claim 14, wherein the connector extends through the openings at the location about which the two leg members rotate to collapse the legs.

16. The laundry drying rack of claim 12 wherein the post end extends through the openings at the location about which the two leg members rotate to collapse the legs.

17. A laundry drying rack having two collapsible legs, each leg having at least one pair of elongate leg members, each leg member having an opening formed laterally therein at a location about which the leg members rotate to collapse the legs, the rack having a plurality of connecting rods each having distal ends connected to different ones of the legs, the laundry drying rack comprising:
    a cylindrical connector having an open end, an opposing flanged end, and a post section disposed therebetween, the open end having a recess formed therein extending axially toward the flanged end with a distal end of one of the connecting rods being placed in the recess, the flanged end being sized so it does not pass through an opening in one of the leg members through which the connector is inserted, the post section having an external groove with the post section being sized so the groove is located adjacent the leg member through which the connector is inserted but on an opposing side of the leg member as the flanged end, and a retaining member resiliently engaging the groove to prevent removal of the connector from the opening through which the connector is inserted.

18. The laundry drying rack of claim 17, wherein the retaining member comprises a plastic ring having a tapered opening to help slide the ring over the open end and into the groove.

19. The laundry drying rack of claim 17, wherein the recess is tapered and sized and configured to engage the connecting rod in press-fit engagement.

20. The laundry drying rack of claim 17, wherein the connector extends through the openings at the location about which two leg members rotate to collapse the legs.

21. The laundry drying rack of claim 17, further comprising:
an end connector having an end with resilient prongs and a post end, the post end being sized and configured to extend within the opening in each of the leg members; and
a tubular coupling having a distal end, an opposing proximal end, and an internal ridge formed circumferentially therein, the proximal end being sized and configured to axially receive a distal end of one of the connecting rods therein, the distal end being sized and configured to axially receive the prongs therein, the internal ridge being sized and configured to engage the resilient prongs and restrain removal of the prongs from the coupling.

22. A laundry drying rack comprising:
two collapsible legs each having a pair of elongate leg members rotating about a common axis to collapse and expand the legs, each leg member having an opening formed laterally therein;
a connecting rod having opposing distal ends each connected to a different one of the collapsible legs;
a cylindrical connector having an open end, an opposing flanged end, and a post section disposed therebetween, the open end having a recess formed therein extending axially toward the flanged end, a distal end of the connecting rod being received in the recess, the flanged end having a flange that prevents passage of the connector through an opening in a leg member through which the connector is inserted, the post section having an external groove circumferentially formed therein, the post section being sized to place the groove on a side of the leg member through which the connector is inserted that is opposite the flanged end of the connector; and
an elastic retaining ring sized and configured to receive the open end of the cylindrical connector therethrough and engage the groove to capture the elongate leg member through which the connector is inserted between the flange and the ring.

23. The laundry drying rack of claim 22, wherein the connector is inserted through the leg members at the location about which the leg members rotate to collapse the legs.

24. A kit for a laundry drying rack, comprising:
two collapsible legs each having at least a pair of elongate leg members adapted to be joined to rotate about a common axis to collapse and expand the legs when the laundry rack is assembled, each leg member having an opening formed laterally therein;
a plurality of connecting rods having opposing distal ends and sized so the opposing ends can connect to a different one of the collapsible legs when the laundry rack is assembled;
a plurality of cylindrical connectors each having an open end, an opposing flanged end, and a post section disposed therebetween, the open end having a recess formed therein extending axially toward the flanged end, a distal end configured to receive a connecting rod in the recess when the laundry rack is assembled, the flanged end having a flange that prevents passage of the connector through an opening in a leg member through which the connector is inserted during use when the laundry rack is assembled, the post section having an external groove circumferentially formed therein, the post section being sized to place the groove on a side of the leg member through which the connector is inserted that is opposite the flanged end of the connector when the laundry rack is assembled, one of the cylindrical connectors and connecting members being adapted to be inserted through openings in the leg members to join the leg members so they rotate about the common axis to collapse and expand the legs when the laundry rack is assembled, each leg having correspondingly located cylindrical connectors;
a plurality of elastic retaining rings sized and configured to receive the open end of the cylindrical connector therethrough and engage the groove to capture the elongate leg member through which the connector is inserted between the flange and the ring when the laundry rack is assembled;
at least one pronged connector, each pronged connector having an end with resilient prongs and a post end, the post end being sized and configured to extend through an opening of an elongated member on each leg to fasten the pronged connector to each leg when the laundry rack is assembled; and
at least two tubular couplings each having a distal end, an opposing proximal end, and an internal ridge forming an engaging surface therein, the proximal end of the at least two couplings being adapted to connect to opposing ends of one of the connecting rod when the laundry rack is assembled, the distal end being sized and configured to axially receive the prongs therein when the laundry rack is assembled, the internal ridge being configured and located to engage the resilient prongs and restrain removal of the prongs from the coupling when the laundry rack is assembled.

25. The kit of claim 24, wherein there are a plurality of connecting rods with couplings on opposing ends of the rods.

26. A method of assembling a laundry drying rack, comprising the steps of:
providing-two collapsible legs each having at least a pair of elongate leg members joined to rotate about a common axis to collapse and expand the legs, providing each leg with at least one correspondingly located cylindrical connector at one of the common axis of rotation, whereby the connector comprising an open end, an opposing flanged end abutting a first side of the leg member through which the connector is inserted, the retaining member engaging the connector to prevent removal of the connector from the leg, the open end having a recess therein, and further providing each leg with pronged connectors, the pronged connectors each having an end with resilient prongs and an opposing post end, inserting each post end through an opening in at least one of the leg members to fasten the pronged connector to the leg member;

providing at least one connecting rod with a tubular coupling on opposing end of the rod, each tubular coupling having a proximal end connected to one end of the rod and also having a distal end and an internal engaging surface, the distal end being sized and configured to axially receive the prongs therein, the internal engaging surface being sized and configured to engage the resilient prongs and restrain removal of the prongs from the coupling;

inserting distal ends of a connecting rod into the recesses of corresponding connectors on both legs to connect the legs together; and inserting distal ends of the couplings on the at least one connecting rod over the corresponding prongs on opposing legs to engage the prongs with the internal recess of the engaged coupling to restrain the legs from moving away from each other along a longitudinal axis of the rod having the couplings.

* * * * *